(12) United States Patent
Shimizu et al.

(10) Patent No.: US 12,214,741 B2
(45) Date of Patent: Feb. 4, 2025

(54) GAS GENERATOR

(71) Applicant: NIPPON KAYAKU KABUSHIKI KAISHA, Chiyoda-ku (JP)

(72) Inventors: Tomoya Shimizu, Himeji (JP); Shinya Ueda, Himeji (JP); Haruki Takizawa, Himeji (JP); Yuji Inoue, Himeji (JP)

(73) Assignee: NIPPON KAYAKU KABUSHIKI KAISHA, Chiyoda-ku (JP)

( * ) Notice: Subject to any disclaimer, the term of this patent is extended or adjusted under 35 U.S.C. 154(b) by 0 days.

(21) Appl. No.: 18/550,490

(22) PCT Filed: Feb. 16, 2022

(86) PCT No.: PCT/JP2022/006140
§ 371 (c)(1),
(2) Date: Sep. 14, 2023

(87) PCT Pub. No.: WO2022/196228
PCT Pub. Date: Sep. 22, 2022

(65) Prior Publication Data
US 2024/0149824 A1    May 9, 2024

(30) Foreign Application Priority Data

Mar. 19, 2021 (JP) ................. 2021-046137
Dec. 14, 2021 (JP) ................. 2021-202541

(51) Int. Cl.
*B60R 21/264*        (2006.01)
*C06D 5/00*          (2006.01)

(52) U.S. Cl.
CPC .............. *B60R 21/264* (2013.01); *C06D 5/00* (2013.01)

(58) Field of Classification Search
CPC ................. B60R 21/264; C06D 5/00
See application file for complete search history.

(56) References Cited

U.S. PATENT DOCUMENTS 5,366,239 A * 11/1994 Headley .............. B60R 21/2644
                                                   280/743.1
6,068,291 A *  5/2000 Lebaudy ............ B60R 21/2644
                                                   280/736
(Continued)

FOREIGN PATENT DOCUMENTS

JP      2002-200420 A     7/2002
JP      2008-296763 A    12/2008
(Continued)

OTHER PUBLICATIONS

International Search Report Issued Apr. 7, 2020, in PCT/JP2022/006140, filed on Feb. 16, 2022, 2 pages.

*Primary Examiner* — Michelle Clement
(74) *Attorney, Agent, or Firm* — Oblon, McClelland, Maier & Neustadt, L.L.P.

(57) ABSTRACT

A gas generator includes a housing main body made of metal, a holder assembly, and an igniter. The holder assembly includes a holder portion made of metal and a connector portion made of resin. The holder portion includes a first barrel portion and an annular projection. The connector portion includes a second barrel portion and a cylindrical portion. The cylindrical portion is inserted in the housing main body and externally attached to the first barrel portion. As a portion of the housing main body corresponding to the cylindrical portion is decreased in diameter, the cylindrical portion is compressed by being sandwiched between the portion of the housing main body decreased in diameter and the first barrel portion so as to seal a gap between the housing main body and the first barrel portion.

10 Claims, 14 Drawing Sheets

(56) References Cited

U.S. PATENT DOCUMENTS

| | | | | |
|---|---|---|---|---|
| 6,474,684 | B1* | 11/2002 | Ludwig | C06D 5/06 |
| | | | | 280/736 |
| 6,692,022 | B2* | 2/2004 | Schenck | B60R 21/276 |
| | | | | 280/739 |
| 6,964,430 | B2* | 11/2005 | Blackburn | B60R 21/2644 |
| | | | | 280/741 |
| 7,427,082 | B2* | 9/2008 | Schoenhuber | B60R 21/26 |
| | | | | 280/736 |
| 8,740,245 | B2* | 6/2014 | Fukawatase | C06D 5/00 |
| | | | | 280/736 |
| 9,010,803 | B2* | 4/2015 | Smith | B60R 21/264 |
| | | | | 280/741 |
| 9,452,729 | B2* | 9/2016 | Bierwirth | B60R 21/261 |
| 10,730,474 | B2* | 8/2020 | Takizawa | B60R 21/2644 |
| 11,001,224 | B2* | 5/2021 | Ueda | B01J 7/00 |
| 11,052,865 | B2* | 7/2021 | Hiraoka | B60R 21/264 |
| 2002/0189487 | A1 | 12/2002 | Kubo et al. | |
| 2003/0146611 | A1* | 8/2003 | Kenney | B60R 21/2644 |
| | | | | 280/736 |
| 2009/0295132 | A1* | 12/2009 | Jackson | B01D 39/12 |
| | | | | 280/736 |
| 2011/0265678 | A1* | 11/2011 | Sasamoto | B60R 21/2644 |
| | | | | 102/530 |
| 2013/0200600 | A1* | 8/2013 | Bierwirth | B60R 21/261 |
| | | | | 280/740 |
| 2017/0015273 | A1* | 1/2017 | Kobayashi | B60R 21/274 |
| 2017/0043742 | A1* | 2/2017 | Ueda | B60R 21/264 |
| 2017/0043743 | A1* | 2/2017 | Kobayashi | B60R 21/274 |
| 2018/0312132 | A1* | 11/2018 | Ohsugi | B60R 21/2644 |
| 2019/0023220 | A1* | 1/2019 | Takizawa | B60R 21/2644 |
| 2020/0023805 | A1 | 1/2020 | Hiraoka | |

FOREIGN PATENT DOCUMENTS

| | | |
|---|---|---|
| JP | 2009-126292 A | 6/2009 |
| JP | 2009-137402 A | 6/2009 |
| JP | 2016-22929 A | 2/2016 |
| JP | 2017-193191 A | 10/2017 |
| JP | 2017-193192 A | 10/2017 |
| JP | 2018-69924 A | 5/2018 |

* cited by examiner

FIG.14

|  | PRESENCE OF COIL SPRING | COIL SPRING ||| CLEARANCE [mm] | OUTPUT INDICATOR [ms] |
|---|---|---|---|---|---|---|
|  |  | INNER DIAMETER [mm] | DIAMETER [mm] | THE NUMBER OF TURNS [TURNS] |  |  |
| COMPARATIVE EXAMPLE | NO | – | – | – | 4.7 | 2.70 |
| VERIFICATION EXAMPLE 1 | YES | 7.9 | 0.8 | 9 | 0 | 2.40 |
| VERIFICATION EXAMPLE 2 | YES | 9.0 | 0.8 | 9 | 0.5 | 2.55 |
| VERIFICATION EXAMPLE 3 | YES | 10.0 | 0.8 | 9 | 1.0 | 2.60 |

GAS GENERATOR

TECHNICAL FIELD

The present invention relates to a gas generator incorporated in an air bag apparatus as a passenger protection apparatus equipped in a car and the like, and particularly to what is called a cylinder type gas generator having an elongated columnar outer geometry that is suitably incorporated into a side air bag apparatus and the like.

BACKGROUND ART

From a point of view of protection of a driver and/or a passenger in a car, an air bag apparatus which is a passenger protection apparatus has conventionally widely been used. The air bag apparatus is equipped for the purpose of protecting a driver and/or a passenger against shock caused at the time of collision of a vehicle, and it receives a body of a driver or a passenger with the air bag serving as a cushion by instantaneously expanding and developing the air bag at the time of collision of a vehicle.

A gas generator is equipment which is incorporated in this air bag apparatus, an igniter therein being ignited in response to power feed caused by a control unit at the time of collision of a vehicle to thereby burn a gas generating agent with flame caused by the igniter and instantaneously generate a large amount of gas, and thus expands and develops an air bag.

Depending on a position of installation in a vehicle and the like or on specifications such as output, gas generators of various constructions are available. A gas generator called a cylinder type gas generator represents one example. The cylinder type gas generator has an outer geometry in an elongated columnar shape and it is suitably incorporated in a side air bag apparatus, a curtain air bag apparatus, a knee air bag apparatus, or a seat cushion air bag apparatus.

Normally, in a cylinder type gas generator, an igniter is assembled at one end in an axial direction of a housing, a combustion chamber accommodating a gas generating agent is provided on a side of the one end, a filter chamber accommodating a filter is provided on a side of the other end in the axial direction of the housing, and a gas discharge opening is provided in a circumferential wall portion of the housing in a portion defining the filter chamber.

In the cylinder type gas generator thus constructed, gas generated in the combustion chamber flows into the filter chamber along the axial direction of the housing and passes through the filter, and the gas which has passed through the filter is discharged to the outside through the gas discharge opening.

For example, Japanese Patent Laying-Open No. 2017-193191 (PTL 1) discloses a cylinder type gas generator provided with such a construction.

In the cylinder type gas generator disclosed in PTL 1, a coil spring that biases the gas generating agent toward the other end of the housing is provided between the one end of the housing to which the igniter is assembled and the gas generating agent. The coil spring serves to fix the gas generating agent in the inside of the housing while it appropriately maintains a distance from the igniter assembled to the one end of the housing to the gas generating agent.

In the gas generator disclosed in PTL 1, a substantially cylindrical combustion control cover made of metal is provided on a side of the one end of the housing to cover an ignition portion of the igniter which is portion where the ignition agent is accommodated. The combustion control cover serves to efficiently guide thermal particles produced in the igniter at the time of activation to the gas generating agent, and more specifically to give directivity in a direction of travel of thermal particles produced in the ignition portion.

With the cylinder type gas generator constructed as such, good gas output characteristics at the time of activation can be obtained.

In general, it is important to airtightly seal the gas generating agent from the outside in the gas generator. This is because, if the gas generating agent absorbs moisture, desired gas output characteristics may not be obtained.

In order to prevent the gas generating agent from absorbing moisture in the cylinder type gas generator, a method of accommodating the gas generating agent in a container formed from a weak member that melts or bursts by heat or a pressure resulting from activation of the igniter, hermetically sealing the container, and arranging the container in the inside of the housing is available. For example, Japanese Patent Laying-Open No. 2018-69924 (PTL 2) discloses a cylinder type gas generator for which such a method is adopted.

When the method above is adopted, however, manufacturing cost may increase. Specifically, component cost for the container formed from the weak member described above is relatively high, and works for accommodating the gas generating agent in the container and thereafter hermetically sealing the container require considerable time and efforts. Therefore, manufacturing cost increases also in this aspect.

In another method of preventing the gas generating agent from absorbing moisture in the cylinder type gas generator, for example, an O ring or a sealing tape may be provided in a portion of the housing so as to airtightly seal a combustion chamber where the gas generating agent is accommodated. For example, Japanese Patent Laying-Open No. 2008-296763 (PTL 3) discloses a cylinder type gas generator for which such a method is adopted.

In the cylinder type gas generator disclosed in PTL 3, the housing includes a housing main body substantially in a shape of a circular cylinder and a holder that holds an igniter, the holder being inserted in an opening end of the housing main body. A sealing member formed, for example, from an O ring is interposed between the housing main body and the holder. In addition, a sealing member formed, for example, from a sealing tape is attached to close a communication hole provided in a member that serves as a partition between the combustion chamber and a filter chamber. Airtightness in these portions is thus ensured. Adoption of such an approach can lead to suppression of manufacturing cost as compared with an example where a gastight enclosure is used.

CITATION LIST

Patent Literature

PTL 1: Japanese Patent Laying-Open No. 2017-193191
PTL 2: Japanese Patent Laying-Open No. 2018-69924
PTL 3: Japanese Patent Laying-Open No. 2008-296763

SUMMARY OF INVENTION

Technical Problem

In the cylinder type gas generator disclosed in PTL 3, however, the holder described above is required to achieve such functions and characteristics as holding of the igniter, reception of a connector connected to the igniter, secure connection thereof to the housing main body, and strength enough to withstand increase in internal pressure in the combustion chamber at the time of activation of the gas generator. Therefore, the holder is inevitably complicated in shape, which requires higher accuracy in working. Consequently, component cost of the holder becomes disadvantageously high.

Furthermore, since the holder is a relatively large component made of metal, the cylinder type gas generator inevitably disadvantageously increases in weight.

In an example where the coil spring and a combustion control cover are provided as in the cylinder type gas generator disclosed in PTL 1, a large number of components should be provided in a portion on the side of the above-described one end of the housing. Therefore, not only the number of components is large but also assembly works are complicated. Consequently, manufacturing cost disadvantageously increases. Reduction in number of components could also bring about reduction in weight of the gas generator as a whole.

Therefore, the present invention was made to solve the problems described above, and an object thereof is to provide a gas generator capable of achieving reduction in manufacturing cost and reduction in weight.

Solution to Problem

A gas generator based on the present invention includes a housing main body, a holder assembly, and an igniter. The housing main body is made of a cylindrical member made of metal, the member containing a combustion chamber where a gas generating agent is accommodated. The holder assembly is inserted in an opening end in an axial direction of the housing main body, and includes a hollow opening like a through hole, the hollow opening extending along a direction in parallel to the axial direction of the housing main body. The igniter includes an ignition portion where an ignition agent is accommodated and a terminal pin connected to the ignition portion, and at least a part of the igniter is arranged in the inside of the hollow opening while the ignition portion is located on a side of the combustion chamber and the terminal pin is located opposite to the side of the combustion chamber. The holder assembly includes a holder portion made of metal, the holder portion being located on the side of the combustion chamber, the holder portion receiving and holding the igniter, and a connector portion made of resin, the connector portion being located opposite to the side of the combustion chamber, the connector portion receiving a connector connected to the terminal pin. The holder portion includes a first barrel portion in a cylindrical shape that defines the hollow opening and an annular projection that projects from the first barrel portion along a radial direction of the housing main body. The connector portion includes a second barrel portion in a cylindrical shape that defines the hollow opening and a cylindrical portion that extends from the second barrel portion toward the combustion chamber. The cylindrical portion is inserted in the opening end of the housing main body and externally attached to a portion of the first barrel portion located opposite to the side of the combustion chamber when viewed from the annular projection. In the gas generator based on the present invention, a portion of the housing main body corresponding to the cylindrical portion is decreased in diameter radially inward, so that the cylindrical portion is compressed by being sandwiched between the portion of the housing main body decreased in diameter and the first barrel portion to seal a gap between the housing main body and the first barrel portion.

In the gas generator based on the present invention, the cylindrical portion is larger in inner diameter than the second barrel portion and an annular stepped surface that connects an inner circumferential surface of the second barrel portion and an inner circumferential surface of the cylindrical portion to each other is provided in the connector portion, so that a first chamber defined by the annular stepped surface and the inner circumferential surface of the cylindrical portion may be provided at an axial end of the connector portion located on the side of the combustion chamber. In that case, preferably, the first barrel portion is inserted in the first chamber and an axial end surface of the first barrel portion located opposite to the side of the combustion chamber abuts on the annular stepped surface.

In the gas generator based on the present invention, the second barrel portion is larger in inner diameter than the first barrel portion, so that a second chamber defined by an axial end surface of the first barrel portion located opposite to the side of the combustion chamber and an inner circumferential surface of the second barrel portion may be provided at an axial end of the holder assembly located opposite to the side of the combustion chamber. In that case, preferably, a portion that receives the connector connected to the terminal pin is defined by the second chamber.

In the gas generator based on the present invention, an outer circumferential surface of the first barrel portion may be decreased in diameter toward the combustion chamber.

The gas generator based on the present invention may further include a filter arranged in the inside of the housing main body and a partition member arranged in the inside of the housing main body to divide, in the axial direction of the housing main body, a space in the inside of the housing main body into a filter chamber where the filter is arranged and the combustion chamber. In that case, the partition member may be fixed to the housing main body by being welded.

The gas generator based on the present invention may further include a coil spring interposed between the holder assembly and the gas generating agent, the coil spring fixing the gas generating agent in the inside of the housing main body by biasing the gas generating agent toward a side opposite to a side where the holder assembly is located while the gas generating agent is spaced apart from the ignition portion. In that case, the ignition portion may include a cup body cleaved by ignition of the ignition agent at the time of activation of the igniter. Furthermore, in that case, the coil spring may be arranged substantially coaxially with the ignition portion to surround the ignition portion without interposition of another member between the coil spring and the ignition portion, so as to restrict a degree of opening of the cup body at the time of cleavage of the cup body.

In the gas generator based on the present invention, the ignition portion may have a substantially columnar outer geometry, and the coil spring may include a circular cylindrical portion located on a side of the holder assembly and having a constant inner diameter and an increased-diameter portion that extends from an end of the circular cylindrical portion on a side of the gas generating agent toward the gas generating agent and increases in inner diameter toward the gas generating agent. In that case, preferably, a portion of the coil spring that surrounds the igniter is implemented by the circular cylindrical portion.

The gas generator based on the present invention preferably satisfies a condition of $0 < C \leq (R1-R2) \times (L2/L1)/2$, where $R1$ represents an inner diameter of a portion of the housing main body where the gas generating agent is accommodated, R2 represents an outer diameter of the ignition portion, L1 represents a distance along the axial direction of the housing main body from a portion of the ignition portion where the ignition agent is accommodated to the gas generating agent, L2 represents a distance along the axial direction of the housing main body from the portion of the ignition portion where the ignition agent is accommodated to a boundary between the circular cylindrical portion and the increased-diameter portion, and C represents a clearance between the ignition portion and the circular cylindrical portion.

In the gas generator based on the present invention, preferably, the clearance is not larger than 1.0 mm.

In the gas generator based on the present invention, a portion of the coil spring that surrounds the ignition portion may be in contact with the ignition portion.

Advantageous Effects of Invention

According to the present invention, a gas generator capable of achieving reduction in manufacturing cost and reduction in weight can be provided.

BRIEF DESCRIPTION OF DRAWINGS

FIG. 14 shows a table of a test condition and a test result in a verification test.

DESCRIPTION OF EMBODIMENTS

Figure 1:
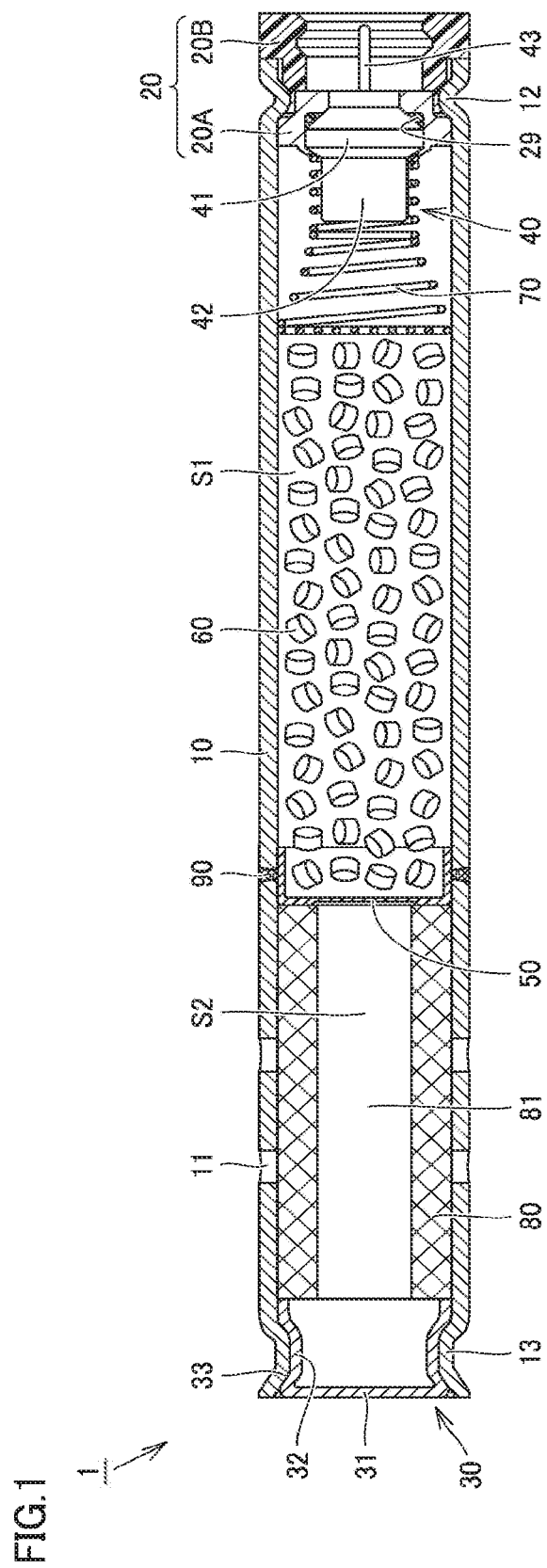
FIG. 1 is a schematic diagram of a cylinder type gas generator according to a first embodiment.

An embodiment of the present invention will be described hereinafter in detail with reference to the drawings. An embodiment shown below represents application of the present invention to a cylinder type gas generator incorporated in a side air bag apparatus. The same or common elements in an embodiment shown below have the same reference characters allotted in the drawings and description thereof will not be repeated.

First Embodiment

Figure 2:
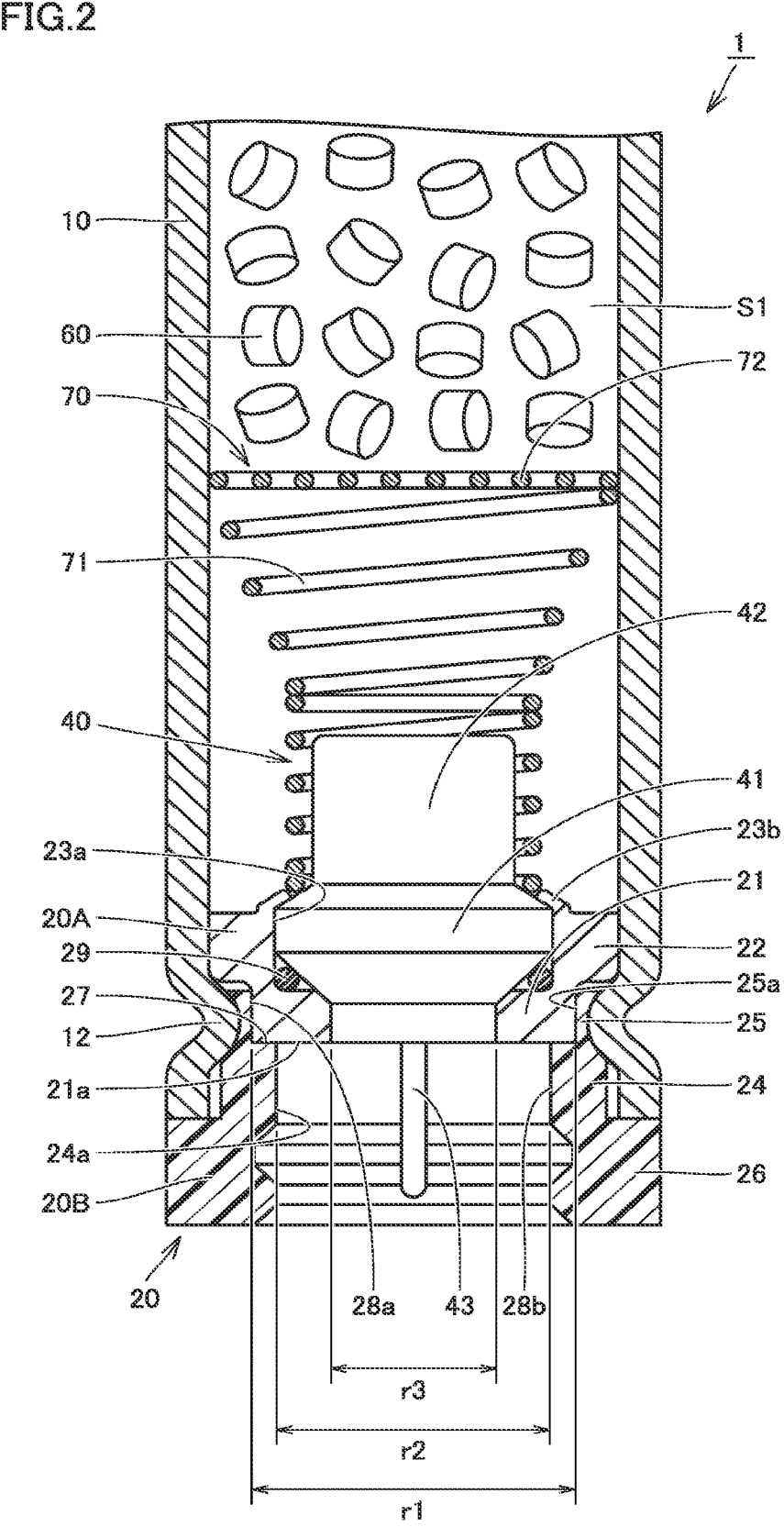
FIG. 2 is an enlarged cross-sectional view of a vicinity of an igniter of the cylinder type gas generator shown in FIG. 1.
Figure 3:
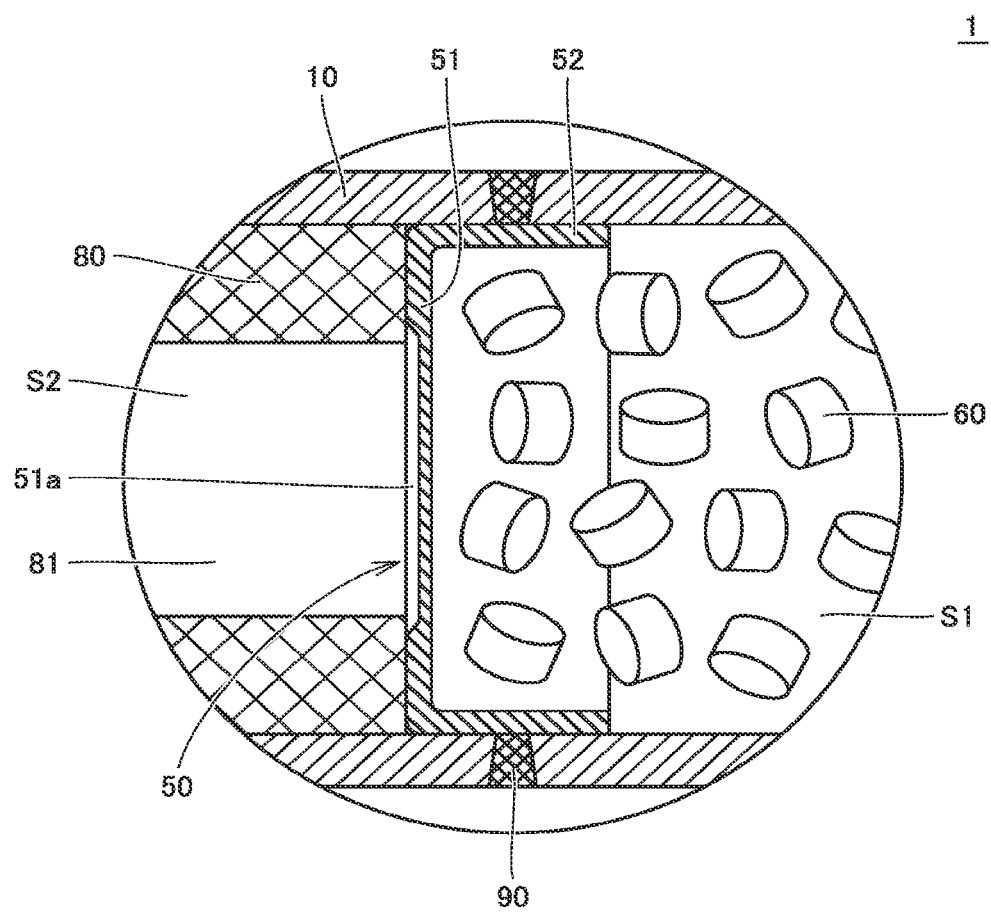
FIG. 3 is an enlarged cross-sectional view of the vicinity of a partition member of the cylinder type gas generator shown in FIG. 1.

FIG. 1 is a schematic diagram of a cylinder type gas generator according to a first embodiment. FIGS. 2 and 3 are an enlarged cross-sectional view of the vicinity of an igniter and an enlarged cross-sectional view of the vicinity of a partition member, of the cylinder type gas generator shown in FIG. 1, respectively. A construction of a cylinder type gas generator 1 according to the present embodiment will initially be described with reference to FIGS. 1 to 3.

As shown in FIG. 1, cylinder type gas generator 1 according to the present embodiment has an elongated columnar outer geometry and has an elongated circular cylindrical housing having closed one and the other ends located in an axial direction. The housing includes a housing main body 10, a holder assembly 20, and a closing member 30.

An igniter 40, a partition member 50, a gas generating agent 60, a coil spring 70, and a filter 80 as internal components are accommodated in the housing constituted of housing main body 10, holder assembly 20, and closing member 30. In the housing, a combustion chamber S1 where gas generating agent 60 among the internal components described above is mainly arranged and a filter chamber S2 where filter 80 is arranged are located.

Housing main body 10 is made of an elongated circular cylindrical member which implements a circumferential wall portion of the housing and has an opening provided at each of opposing ends in the axial direction. Holder assembly 20 is formed from a cylindrical member including a hollow opening like a through hole which extends in a direction in parallel to the axial direction of housing main body 10, and includes a holder portion 20A and a connector portion 20B which will be described later. Closing member 30 is in a shape of a cup including a closing portion 31 and a sidewall portion 32, and includes an annular recess 33 around a circumferential surface of sidewall portion 32 for fixing by swaging which will be described later. This annular recess 33 for fixing by swaging is provided as extending in a circumferential direction in the circumferential surface of sidewall portion 32.

Housing main body 10 may be formed from a member made of metal such as stainless steel, iron steel, an aluminum alloy, or a stainless alloy or from a circularly cylindrically formed press-formed product by press-working of a rolled steel plate represented by SPCE. Alternatively, housing main body 10 may be formed from an electric resistance welded tube represented by STKM.

In particular, when housing main body 10 is formed from a press-formed product of a rolled steel plate or an electric resistance welded tube, housing main body 10 can be formed more inexpensively and readily and with much lighter weight than when the housing main body is formed from a member made of metal such as stainless steel or iron steel.

Holder portion 20A of holder assembly 20 and closing member 30 are formed from a member made of metal such as stainless steel, iron steel, an aluminum alloy, or a stainless alloy.

Holder assembly 20 is fixed to housing main body 10 so as to close one axial opening end of housing main body 10.

Specifically, while holder assembly 20 is inserted in one opening end of housing main body 10, a prescribed position of housing main body 10 is decreased in diameter radially inward toward an outer circumferential surface of holder assembly 20, so that holder assembly 20 is fixed by swaging to housing main body 10. Thus, one axial end of the housing is implemented by holder assembly 20. Details of fixing by swaging will be described later.

Closing member 30 is fixed to housing main body 10 so as to close the other axial opening end of housing main body 10. Specifically, while closing member 30 is inserted in the other opening end of housing main body 10, a portion of housing main body 10 corresponding to annular recess 33 provided in the circumferential surface of sidewall portion 32 of closing member 30 is engaged with annular recess 33 as being decreased in diameter radially inward so that closing member 30 is fixed by swaging to housing main body 10. The other axial end of the housing is thus implemented by closing member 30.

Such fixing by swaging is called omnidirectional swaging in which housing main body 10 is substantially uniformly decreased in diameter radially inward. With such omnidirectional swaging, swaging portions 12 and 13 are provided in housing main body 10. Swaging portions 12 and 13 are thus in direct contact with the outer circumferential surface of holder assembly 20 and annular recess 33, respectively, so that a gap is prevented from being provided therebetween.

A structure for assembly of closing member 30 to housing main body 10 is not limited to the assembly structure described above, and another assembly structure may be adopted. Alternatively, housing main body 10 and closing member 30 do not have to be separate members, and they may be implemented as one member in a shape of a cylinder with bottom.

As shown in FIGS. 1 and 2, igniter 40 is assembled to the above-described one axial end of the housing by being supported by holder assembly 20. Igniter 40 serves to burn gas generating agent 60 and is set to face a space in the housing.

Igniter 40 serves to initiate flame and it is also referred to as a squib. Igniter 40 includes a base 41, an ignition portion 42, and a pair of terminal pins 43. Base 41 is a part that holds ignition portion 42 and the pair of terminal pins 43 and is also fixed to holder assembly 20. Base 41 holds the pair of terminal pins 43 as the pair of terminal pins is inserted therethrough.

Ignition portion 42 contains an ignition agent that initiates flame by being ignited and burnt at the time of activation and a resistor (bridge wire) for ignition of the ignition agent. The pair of terminal pins 43 is connected to ignition portion 42 for ignition of the ignition agent.

More specifically, ignition portion 42 includes a squib cup formed like a cup. The resistor described above is attached to couple to each other, tip ends of the pair of terminal pins 43 inserted in the squib cup, and the ignition agent is loaded in the squib cup so as to surround the resistor or to be in proximity to the resistor. An enhancer agent may be loaded in ignition portion 42 as necessary.

Here, a Nichrome wire or a resistance wire made of an alloy containing platinum and tungsten is generally used as a resistor, and ZPP (zirconium potassium perchlorate), ZWPP (zirconium tungsten potassium perchlorate), lead tricinate, or the like is generally made use of as the ignition agent. A composition composed of metal powders/oxidizing agent represented by $B/KNO_3$, $B/NaNO_3$, or $Sr(NO_3)_2$, a composition composed of titanium hydride/potassium perchlorate, or a composition composed of B/5-aminotetrazole/ potassium nitrate/molybdenum trioxide is employed as the enhancer agent.

Upon sensing collision, a prescribed amount of current flows in a resistor through terminal pin 43. As the prescribed amount of current flows in the resistor, Joule heat is generated in the resistor and the ignition agent starts burning. Thermal particles at a high temperature caused by burning cleave the squib cup where the ignition agent is accommodated. A time period from flow of a current in the resistor until activation of igniter 40 is generally not longer than 2 milliseconds in a case that the Nichrome wire is employed as the resistor.

Igniter 40 is fixed to holder assembly 20 while ignition portion 42 thereof projects toward the inside of the housing and a part thereof is arranged in the inside of the above-described hollow opening of holder assembly 20. Igniter 40 thus has ignition portion 42 located on a side of combustion chamber S1 and has terminal pins 43 located opposite to the side of combustion chamber S1. Details of a structure for fixing igniter 40 to holder assembly 20 will be described later.

As shown in FIGS. 1 and 3, partition member 50 is arranged at a prescribed position in the space in the housing. Partition member 50 is a member for partitioning the space in the housing into combustion chamber S1 and filter chamber S2 in the axial direction.

Partition member 50 is in a shape of a circular cylinder with bottom, and formed from a member made of metal such as stainless steel, iron steel, an aluminum alloy, or a stainless alloy. Partition member 50 includes a separation wall portion 51 in a form of a flat plate arranged to be orthogonal to the axial direction of housing main body 10 and an annular wall portion 52 in a form of a cylindrical wall erected from a circumferential edge of separation wall portion 51. Partition member 50 is arranged such that a main surface on an outer side of separation wall portion 51 abuts on filter 80 and an outer circumferential surface of annular wall portion 52 abuts on an inner circumferential surface of housing main body 10.

A score 51a is provided in a main surface of separation wall portion 51 which abuts on filter 80. Score 51a serves to provide an opening as a result of rupture of separation wall portion 51 with increase in internal pressure in combustion chamber S1 as a result of burning of gas generating agent 60, and it is provided, for example, as a plurality of grooves provided to radially intersect with one another. Score 51a is provided in a portion in filter 80 opposed to a hollow portion 81.

Partition member 50 is fixed by being joined to housing main body 10 while it is located in housing main body 10. More specifically, partition member 50 is fixed by being press-fitted into housing main body 10 and being welded at a portion of contact between annular wall portion 52 of partition member 50 and housing main body 10 or in the vicinity thereof.

A welded portion 90 that extends along the circumferential direction of housing main body 10 is thus formed in partition member 50 and the portion of housing main body 10 where partition member 50 is located. Electron beam welding, laser welding, resistance welding, and the like can suitably be used for welding between partition member 50 and housing main body 10.

When partition member 50 is thus fixed to housing main body 10 by welding, a gap between partition member 50 and housing main body 10 is buried and thus sealed by welded portion 90. Therefore, according to such a construction, airtightness in that portion can be ensured.

The method of fixing partition member 50 to housing main body 10 is not limited to the fixing method using press-fitting and welding described above, and another fixing method may be used. Airtightness between partition member 50 and housing main body 10 in that case can be ensured by providing an O ring or a sealing tape at an appropriate position.

As shown in FIGS. 1 to 3, in a space inside the housing, gas generating agent 60 and coil spring 70 are arranged in a space lying between holder assembly 20 and partition member 50 (that is, combustion chamber S1).

Gas generating agent 60 is an agent which is ignited by thermal particles produced as a result of activation of igniter 40 and produces gas as it burns. A non-azide-based gas generating agent is preferably employed as gas generating agent 60, and gas generating agent 60 is formed as a molding generally containing a fuel, an oxidizing agent, and an additive.

For the fuel, for example, a triazole derivative, a tetrazole derivative, a guanidine derivative, an azodicarbonamide derivative, a hydrazine derivative, or the like, or combination thereof is made use of Specifically, for example, nitroguanidine, guanidine nitrate, cyanoguanidine, 5-aminotetrazole, and the like are suitably made use of.

As the oxidizing agent, for example, basic metal salt such as basic copper nitrate and basic copper carbonate, perchlorate such as ammonium perchlorate or potassium perchlorate, nitrate containing cations selected from an alkali metal, an alkali earth metal, a transition metal, and ammonia, or the like is made use of. As the nitrate, for example, sodium nitrate, potassium nitrate, or the like is suitably made use of.

As the additive, a binder, a slag formation agent, a combustion modifier, or the like is exemplified. As the binder, for example, an organic binder such as metal salt of carboxymethyl cellulose and stearate, or an inorganic binder such as synthetic hydrotalcite and Japanese acid clay can suitably be made use of. As the slag formation agent, silicon nitride, silica, Japanese acid clay, or the like can suitably be made use of. As the combustion modifier, a metal oxide, ferrosilicon, activated carbon, graphite, or the like can suitably made use of.

A shape of a molding of gas generating agent 60 includes various shapes such as a particulate shape including a granule, a pellet, and a column, and a disc shape. Among columnar moldings, a molding with holes having through holes in the molding (such as a cylindrical shape with a single hole or a cylindrical shape with multiple holes) is also made use of. These shapes are preferably selected as appropriate depending on specifications of an air bag apparatus in which cylinder type gas generator 1 is incorporated, and for example, a shape optimal for the specifications is preferably selected by selecting a shape allowing change over time of a rate of generation of gas during burning of gas generating agent 60. Furthermore, in addition to a shape of gas generating agent 60, a size of a molding or an amount thereof for filling is preferably selected as appropriate, in consideration of a linear burning velocity, a pressure exponent, or the like of gas generating agent 60.

Coil spring 70 is provided for the purpose of prevention of gas generating agent 60 formed from a molding from being crushed by vibration or the like, and includes a spring portion 71 and a pressing portion 72 formed by bending a metal wire rod. Spring portion 71 is arranged such that one end thereof abuts on holder assembly 20 and/or igniter 40 and pressing portion 72 is formed at the other end of the spring portion. Pressing portion 72 is provided, for example, by arrangement of the metal wire rod substantially in parallel at prescribed intervals, and abuts on gas generating agent 60.

Thus, gas generating agent 60 is elastically biased toward partition member 50 by coil spring 70 and prevented from moving in the housing.

An end of coil spring 70 on a side of holder assembly 20 surrounds ignition portion 42 of igniter 40 so as to be in contact with ignition portion 42 or to be arranged in proximity to ignition portion 42 at a prescribed clearance. According to such a construction, in cleavage of the squib cup of ignition portion 42 at the time of activation of igniter 40, a degree of opening of the squib cup is restricted by coil spring 70.

Therefore, as the degree of opening of the squib cup is appropriately restricted, a direction of travel of thermal particles produced in ignition portion 42 concentrates in the axial direction of housing main body 10 so that the thermal particles can efficiently be guided to gas generating agent 60. In other words, a portion of coil spring 70 that surrounds ignition portion 42 performs also a function to give directivity to the direction of travel of thermal particles produced in ignition portion 42.

Coil spring 70 provided in cylinder type gas generator 1 according to the present embodiment is basically similar in construction or position of arrangement to a coil spring 170 provided in a cylinder type gas generator 1E according to a second embodiment which will be described later. In the second embodiment, the construction and the position of arrangement of coil spring 170 provided in cylinder type gas generator 1E and an effect obtained by providing coil spring 170 will more specifically be described. Therefore, for further understanding of coil spring 70 provided in cylinder type gas generator 1 according to the present embodiment, reference is to be made to the second embodiment which will be described later.

As shown in FIG. 1, in the space in the housing, filter 80 is arranged in the space (that is, filter chamber S2) lying between closing member 30 and partition member 50. Filter 80 is formed from a circular cylindrical member having hollow portion 81 extending in a direction in parallel to the axial direction of housing main body 10, and has one axial end surface abutting on sidewall portion 32 of closing member 30 and has the other axial end surface abutting on separation wall portion 51 of partition member 50.

Filter 80 functions as cooling means for cooling gas by removing heat from the gas at a high temperature when the gas produced as a result of burning of gas generating agent 60 passes through this filter 80 and also functions as removal means for removing slag (residues) or the like contained in the gas. As described above, by making use of filter 80 formed from a circular cylindrical member, a flow resistance against gas which flows through filter chamber S2 at the time of activation is suppressed and an efficient flow of the gas can be achieved.

A filter formed from an aggregate of metal wire rods or metal mesh materials suitably made of stainless steel or iron steel can be made use of as filter 80. Specifically, a wire gauze of stocking stitch, a plain-woven wire gauze, an aggregate of crimped metal wire rods, or a material obtained by compressing the former with the use of a press can be made use of.

Alternatively, a material obtained by winding a perforated metal plate can also be made use of as filter 80. In this case, as the perforated metal plate, for example, expanded metal obtained by making staggered cuts in a metal plate and providing holes by widening the cuts to thereby work the metal plate in a mesh, hook metal obtained by perforating a metal plate and collapsing burrs caused around a periphery of the hole for flattening, or the like can be made use of.

A plurality of gas discharge openings 11 are provided along the circumferential direction and the axial direction in housing main body 10 in a portion defining filter chamber S2. The plurality of gas discharge openings 11 serve for guiding gas which has passed through filter 80 to the outside of the housing.

An operation of cylinder type gas generator 1 according to the present embodiment when it is activated will now be described with reference to FIG. 1.

With reference to FIG. 1, when a vehicle on which cylinder type gas generator 1 according to the present embodiment is mounted collides, collision is sensed by collision sensing means separately provided in the vehicle and igniter 40 is activated based thereon by current feed caused by a control unit separately provided in the vehicle.

When igniter 40 is activated, the ignition agent or the enhancer agent in addition thereto burns. Then, a pressure in ignition portion 42 increases, which cleaves the squib cup of ignition portion 42, and thermal particles resulting from burning of the ignition agent or the enhancer agent in addition thereto flow to the outside of ignition portion 42.

Coil spring 70 described above provides directivity to thermal particles which flow out of ignition portion 42 so that thermal particles reach gas generating agent 60 accommodated in combustion chamber S1. Thermal particles which have reached gas generating agent 60 burn gas generating agent 60 so that a large amount of gas is produced in combustion chamber S1.

Accordingly, a pressure and a temperature in combustion chamber S1 increase and an internal pressure in combustion chamber S1 reaches a prescribed pressure, which causes a rupture in a portion of partition member 50 where score 51a is provided. An opening (a communication hole) is thus provided in a portion of partition member 50 opposed to hollow portion 81 of filter 80, and combustion chamber S1 and filter chamber S2 communicate with each other through the opening.

Accordingly, gas produced in combustion chamber S1 flows into filter chamber S2 through the opening provided in partition member 50. The gas which has flowed into filter chamber S2 flows along the axial direction through hollow portion 81 of filter 80, thereafter changes its direction toward a radial direction, and passes through filter 80. At that time, heat is removed through filter 80 and the gas is cooled, and slag contained in the gas is removed by filter 80.

The gas which has passed through filter 80 is discharged to the outside of the housing through gas discharge opening 11 provided in housing main body 10. The discharged gas is introduced into an air bag provided adjacently to cylinder type gas generator 1 to thereby expand and develop the air bag.

As described above, cylinder type gas generator 1 according to the present embodiment includes holder assembly 20 as a part of the housing, and holder assembly 20 is attached to the opening end on the side of the above-described one end of housing main body 10. The construction of holder assembly 20, the structure for fixing igniter 40 to holder assembly 20, and the structure for fixing holder assembly 20 to housing main body 10 will be described in detail below with reference to FIG. 2.

As shown in FIG. 2, holder assembly 20 includes holder portion 20A made of metal, holder portion 20A being located on the side of combustion chamber S1, and connector portion 20B made of resin, connector portion 20B being located opposite to the side of combustion chamber S1. Holder assembly 20 is composed as a component integrated by assembly of holder portion 20A and connector portion 20B to each other in advance, and attached to an opening on the side of the above-described one end of housing main body 10.

Holder portion 20A is formed from a member of a flat profile substantially in a shape of a disc, the member including in its central portion, a through portion that extends along the axial direction, and holder portion 20A includes a first barrel portion 21 in a cylindrical shape and an annular projection 22 that projects outward from an outer circumferential surface of first barrel portion 21.

Holder portion 20A is inserted in housing main body 10 such that the axial direction thereof is in parallel to the axial direction of housing main body 10. The through portion provided in holder portion 20A thus defines a part of the above-described hollow opening of holder assembly 20, and annular projection 22 projects from first barrel portion 21 along the radial direction of housing main body 10. Annular projection 22 described above is provided at an end of first barrel portion 21 on the side of combustion chamber S1.

Holder portion 20A is a member that defines combustion chamber S1 provided in the inside of housing main body 10 and functions as a pressure bulkhead. Therefore, holder portion 20A is formed from a member made of metal as described above so as to be strong enough to withstand increase in internal pressure in combustion chamber S1 at the time of activation of cylinder type gas generator 1.

Holder portion 20A is also a member that receives and holds igniter 40. In order to receive igniter 40, an accommodation portion 23a in a recessed shape is provided at an axial end on the side of combustion chamber S1 for receiving holder portion 20A. Accommodation portion 23a communicates with the through portion provided in holder portion 20A. A swaging portion 23b is provided at an end of holder portion 20A on the side of combustion chamber S1 to surround accommodation portion 23a. Swaging portion 23b is a part for fixing by swaging igniter 40 to holder portion 20A.

Igniter 40 is fixed to holder portion 20A with base 41 thereof being accommodated in accommodation portion 23a of holder portion 20A. Specifically, igniter 40 is fixed to holder portion 20A in such a manner that base 41 is inserted in accommodation portion 23a of holder portion 20A, base 41 abuts on a bottom surface of accommodation portion 23a, and swaging portion 23b provided in holder portion 20A is bent in this state. Igniter 40 is thus held by holder portion 20A.

A sealing member 29 formed from an O ring or the like is interposed between holder portion 20A and igniter 40 so as to bury and seal a gap between holder portion 20A and igniter 40. According to such a construction, airtightness in that portion can therefore be ensured. The method of fixing igniter 40 is not limited to the fixing method with the use of swaging portion 23b described above and another fixing method may be used.

Connector portion 20B is formed from a member substantially in a shape of a circular cylinder, the member including in a central portion thereof, a through portion that extends along the axial direction, and includes a second barrel portion 24 in a cylindrical shape, a cylindrical portion 25 that extends along the axial direction from one axial end of second barrel portion 24, and a flange portion 26 provided at the other axial end of second barrel portion 24.

A part of connector portion 20B is inserted in housing main body 10 such that the axial direction thereof is in parallel to the axial direction of housing main body 10. More specifically, a part of connector portion 20B except for flange portion 26 is inserted in the opening end of housing main body 10 and flange portion 26 abuts on an axial end surface of housing main body 10 on the outside of housing main body 10. The through portion provided in connector portion 20B thus defines a part of the above-described hollow opening of holder assembly 20 and cylindrical portion 25 extends from second barrel portion 24 toward combustion chamber S1.

Holder portion 20A described above is fixed by being press-fitted into connector portion 20B. More specifically, first barrel portion 21 of holder portion 20A is press-fitted into cylindrical portion 25 of connector portion 20B so that first barrel portion 21 and cylindrical portion 25 are in pressure contact with each other. Holder portion 20A and connector portion 20B are thus fixed not to readily be detached from each other.

Connector portion 20B serves to receive a connector connected to terminal pin 43 of igniter 40. Terminal pin 43 of igniter 40 is arranged in the inside of connector portion 20B. The through portion provided in connector portion 20B described above defines a part for receiving the connector.

More specifically, in cylinder type gas generator 1, igniter 40 should electrically be connected to a control unit (not shown) of a vehicle or the like provided outside, and a harness is normally used for this electrical connection. A male connector is attached to a tip end of the harness, and connector portion 20B should be provided with a female connector connectable to the male connector. The through portion provided in connector portion 20B implements the female connector.

As the male connector of the harness is inserted in the through portion that functions as the female connector, a core of the harness and terminal pin 43 electrically conduct to each other and thus wired connection between igniter 40 and the control unit of the vehicle or the like is established.

Connector portion 20B also functions as a member that ensures airtightness between housing main body 10 and holder portion 20A. A part for ensuring airtightness between housing main body 10 and holder portion 20A is mainly implemented by cylindrical portion 25 of connector portion 20B.

Specifically, cylindrical portion 25 is inserted in the opening end of housing main body 10 and externally attached to first barrel portion 21 of holder portion 20A. In a portion in the axial direction of housing main body 10 where cylindrical portion 25 is located, first barrel portion 21 of holder portion 20A, cylindrical portion 25 of connector portion 20B, and housing main body 10 are arranged in this order from a radially inner side toward a radially outer side of housing main body 10. In other words, first barrel portion 21 is surrounded by cylindrical portion 25 and cylindrical portion 25 is surrounded by housing main body 10.

A part of housing main body 10 corresponding to cylindrical portion 25 (that is, a portion that covers cylindrical portion 25) is provided with swaging portion 12 decreased in diameter radially inward. As swaging portion 12 is provided, cylindrical portion 25 of connector portion 20B formed from the member made of resin is sandwiched between swaging portion 12 of housing main body 10 formed from the member made of metal and first barrel portion 21 of holder portion 20A formed from the member made of metal, so as to seal the gap between housing main body 10 and first barrel portion 21.

When swaging portion 12 is provided in housing main body 10, cylindrical portion 25 is sandwiched between housing main body 10 and first barrel portion 21, and as a result of application of resulting load, cylindrical portion 25 deforms by being compressed. Cylindrical portion 25 and housing main body 10 thus come in intimate contact with each other, and cylindrical portion 25 and first barrel portion 21 come in intimate contact with each other.

Therefore, since cylindrical portion 25 is interposed between housing main body 10 and first barrel portion 21 as being in contact with housing main body 10 and first barrel portion 21, the gap described above can be sealed. Therefore, according to such a construction, airtightness in that portion can be ensured.

Though a material for connector portion 20B is not particularly restricted, for example, a nylon-based resin as represented by nylon 6, nylon 66, and 6 nylon or 66 nylon filled with a glass filler, a polyacetal (POM) resin, a polycarbonate (PC) resin, a polyphenylene sulfide (PPS) resin, a polybutylene terephthalate (PBT) resin, or the like can suitably be employed.

In holder portion 20A, annular projection 22 is provided at a position closer to combustion chamber S1 relative to first barrel portion 21. Therefore, annular projection 22 also performs a function as a stopper that prevents holder assembly 20 from coming off from housing main body 10. The function of annular projection 22 as the stopper is performed not only while cylinder type gas generator 1 is being manufactured or not operating but also while a pressure caused by increase in internal pressure in combustion chamber S1 at the time of operation is applied.

In cylinder type gas generator 1 according to the present embodiment, an inner diameter r1 of cylindrical portion 25 is larger than an inner diameter r2 of second barrel portion 24, and connector portion 20B is provided with an annular stepped surface 27 that connects an inner circumferential surface 24a of second barrel portion 24 and an inner circumferential surface 25a of cylindrical portion 25 to each other. A first chamber 28a defined by annular stepped surface 27 and inner circumferential surface 25a of cylindrical portion 25 is thus provided at the axial end of connector portion 20B located on the side of combustion chamber S1.

First barrel portion 21 of holder portion 20A is inserted in first chamber 28a and an axial end surface 21a of first barrel portion 21 located opposite to combustion chamber S1 abuts on annular stepped surface 27.

According to such a construction, holder portion 20A and connector portion 20B can be fixed to each other by press-fitting of holder portion 20A into connector portion 20B as described above, and furthermore, holder portion 20A and connector portion 20B can accurately be positioned along the axial direction of housing main body 10.

In cylinder type gas generator 1 according to the present embodiment, inner diameter r2 of second barrel portion 24 is larger than an inner diameter r3 of first barrel portion 21. A second chamber 28b defined by axial end surface 21a of first barrel portion 21 located opposite to combustion chamber S1 and inner circumferential surface 24a of second barrel portion 24 is thus provided at an axial end of holder assembly 20 located opposite to combustion chamber S1.

Second chamber 28b corresponds to the through portion provided in connector portion 20B described above, and implements the above-described female connector to be provided in connector portion 20B.

According to such a construction, the above-described female connector to be provided in connector portion 20B can readily be provided in connector portion 20B and the construction of holder assembly 20 can further be simplified.

Figure 4:
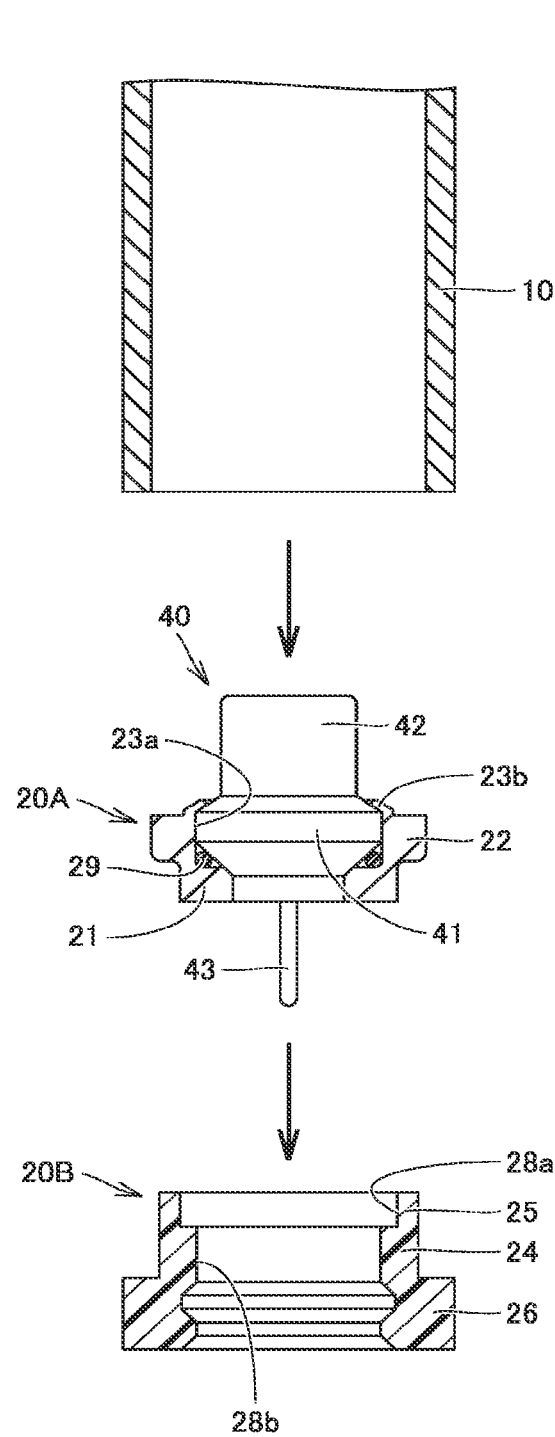
FIG. 4 is a cross-sectional view showing a procedure of assembly of a holder assembly in the cylinder type gas generator shown in FIG. 1.
Figure 5:
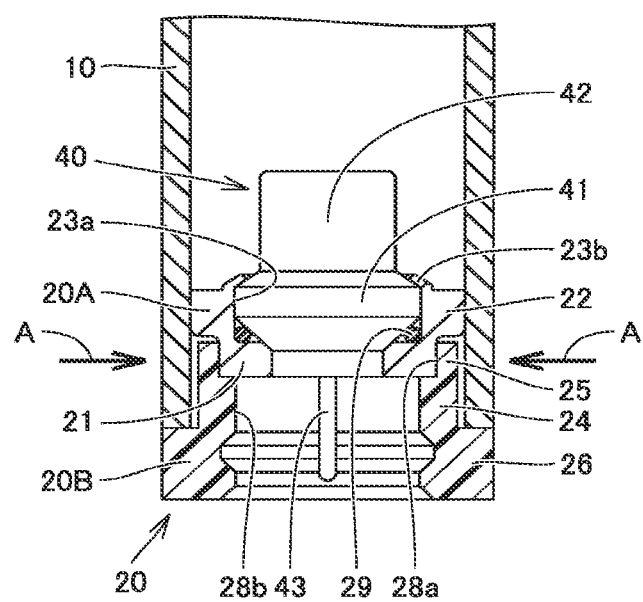
FIG. 5 is a cross-sectional view showing a procedure of assembly of the holder assembly in the cylinder type gas generator shown in FIG. 1.

FIGS. 4 and 5 are cross-sectional views showing a procedure of assembly of the holder assembly in the cylinder type gas generator shown in FIG. 1. The procedure of assembly of holder assembly 20 in cylinder type gas generator 1 according to the present embodiment will now be described with reference to FIGS. 4 and 5.

In assembly of holder assembly 20 to housing main body 10, initially, as shown in FIG. 4, an assembly obtained by assembly of igniter 40 to holder portion 20A is prepared, which is in turn assembled to connector portion 20B. Specifically, first barrel portion 21 of holder portion 20A is press-fitted into cylindrical portion 25 of connector portion 20B, and holder portion 20A to which igniter 40 has been assembled is assembled to connector portion 20B.

Housing main body 10 is then externally attached to holder assembly 20 in which holder portion 20A has been assembled to connector portion 20B. At this time, the opening end of housing main body 10 is externally attached to cover the second barrel portion of connector portion 20B, and furthermore, the axial end surface of housing main body 10 abuts on flange portion 26 of connector portion 20B.

At this time, holder portion 20A may be press-fitted into housing main body 10. In other words, housing main body 10 may externally be attached to holder assembly 20 such that the circumferential surface of annular projection 22 of holder portion 20A is in pressure contact with an inner circumferential surface of housing main body 10. According to such a construction, housing main body 10 and holder assembly 20 are provisionally fixed by press-fitting, and hence handling thereafter is facilitated.

As shown in FIG. 5, swaging for decreasing the diameter at a prescribed position of housing main body 10 is then performed. More specifically, a portion of housing main body 10 corresponding to cylindrical portion 25 of connector portion 20B is decreased in diameter toward the radially inner side of housing main body 10 (that is, in a direction shown with an arrow A in the figure) to thereby provide swaging portion 12 in housing main body 10.

Cylindrical portion 25 of connector portion 20B is thus sandwiched between swaging portion 12 of housing main body 10 and first barrel portion 21 of holder portion 20A so as to seal the gap between housing main body 10 and first barrel portion 21.

Through a series of steps described above, assembly of holder assembly 20 to housing main body 10 is completed, and the opening end on the side of the above-described one end of housing main body 10 is closed by holder assembly 20.

With the cylinder type gas generator according to the present embodiment described above, the gap between housing main body 10 and holder assembly 20 can be sealed by cylindrical portion 25 of connector portion 20B made of resin, which is a part of holder assembly 20. Therefore, since a sealing member such as an O ring formed from a separate component does not have to be used for sealing of that portion, component cost can be reduced and works for assembly are also significantly facilitated.

Furthermore, the holder which has conventionally been composed of a single component made of metal is composed of holder assembly 20 which is a composite component of holder portion 20A made of metal and connector portion 20B made of resin, so that an amount of use of a metal material can drastically be reduced and accordingly the weight can significantly be reduced. In addition, works at high accuracy that have been required in an example where the holder is composed of a single component made of metal are not required, and furthermore, the construction of the holder is significantly simplified. In this aspect as well, cost for a material and cost for working can be reduced.

Therefore, cylinder type gas generator 1 according to the present embodiment can achieve reduction in manufacturing cost and weight as compared with the conventional example.

(First to Fourth Modifications)

Figure 6:
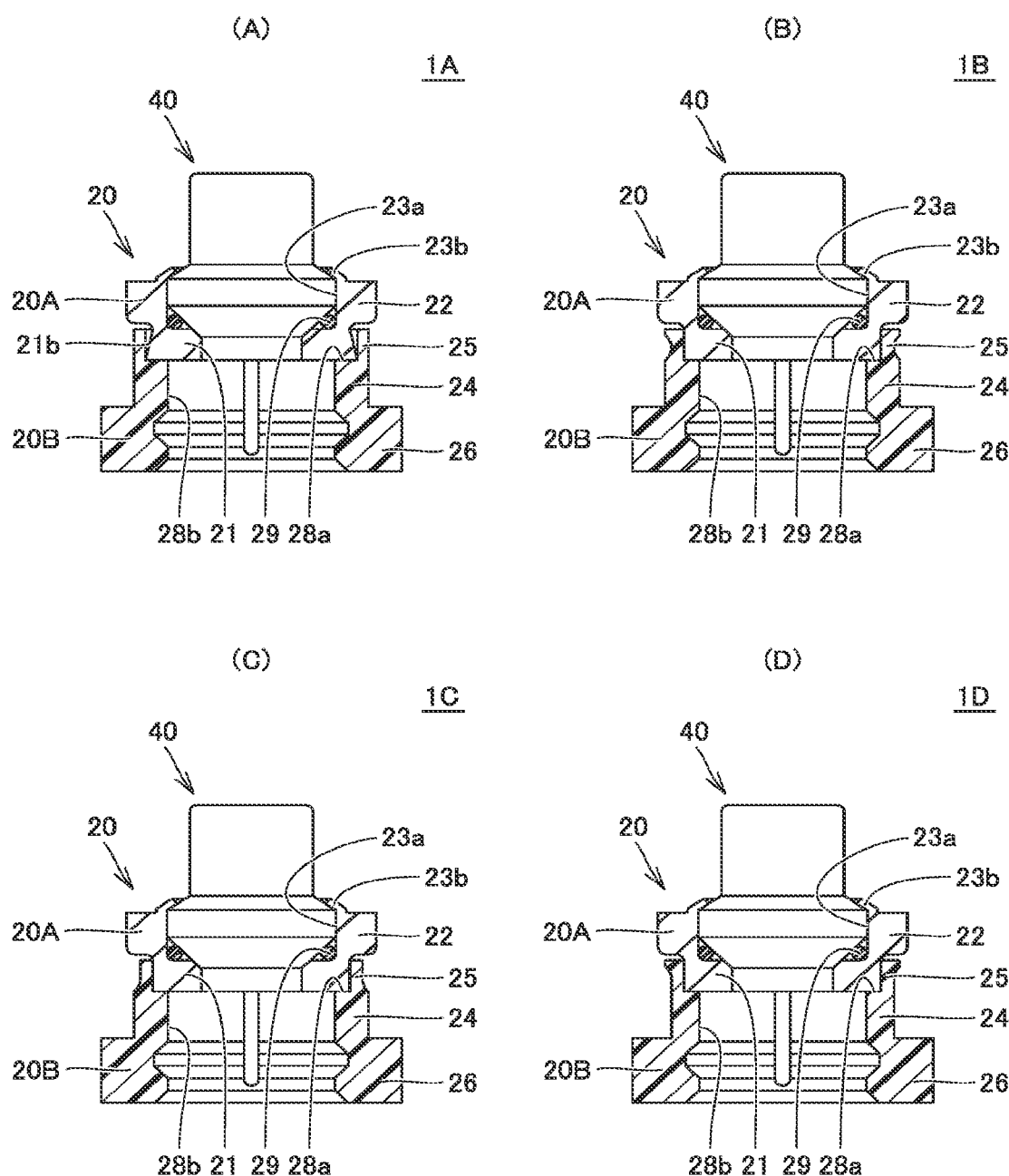
FIG. 6 is a cross-sectional view of holder assemblies of cylinder type gas generators according to first to fourth modifications.

FIG. 6 is a cross-sectional view of holder assemblies of respective cylinder type gas generators according to first to fourth modifications based on the first embodiment described above. Holder assembly 20 of each of cylinder type gas generators 1A to 1D according to the first to fourth modifications will be described below with reference to FIG. 6.

Holder assembly 20 of cylinder type gas generator 1A according to the first modification shown in FIG. 6 (A) is different from the first embodiment described above only in shape of first barrel portion 21 of holder portion 20A.

Specifically, in holder assembly 20 according to the first modification, an outer circumferential surface 21b of first barrel portion 21 is in an inclined shape decreasing in diameter toward combustion chamber S1 (that is, the side opposite to connector portion 20B). Therefore, in a state before assembly of holder assembly 20 to housing main body 10, there is a gap between cylindrical portion 25 of connector portion 20B and first barrel portion 21 of holder portion 20A.

In such a construction, when swaging portion 12 is provided in housing main body 10, cylindrical portion 25 of connector portion 20B deforms by compression as a result of application of load while it is tilted toward the radially inward side of housing main body 10. At this time, load applied to first barrel portion 21 of holder portion 20A by swaging portion 12 provided in housing main body 10 is applied toward a side where terminal pin 43 of igniter 40 is located.

Therefore, in an example where the construction is adopted, swaging portion 12 is more firmly applied to holder portion 20A. Therefore, in addition to the effect described in the first embodiment above, an effect to more reliably prevent holder assembly 20 from coming off from housing main body 10 can be obtained.

Holder assembly 20 in each of cylinder type gas generators 1B to 1D according to the second to fourth modifications shown in FIG. 6 (B) to (D) is different from the first embodiment described above only in shape of cylindrical portion 25 of connector portion 20B.

Specifically, in holder assembly 20 according to each of the second to fourth modifications, a recessed part is provided in advance in the outer circumferential surface of cylindrical portion 25 at a position corresponding to swaging portion 12 provided in housing main body 10.

In holder assembly 20 according to the second modification shown in FIG. 6 (B), the recessed part has a cross-section in a C shape. In holder assembly 20 according to the third modification shown in FIG. 6 (C), a small-thickness portion formed in cylindrical portion 25 by provision of the recessed part extends from a position corresponding to swaging portion 12 provided in housing main body 10 toward combustion chamber S1 (that is, the side opposite to flange portion 26 of connector portion 20B). In holder assembly 20 according to the fourth modification shown in FIG. 6 (D), the small-thickness portion formed in cylindrical portion 25 by provision of the recessed part extends from the position corresponding to swaging portion 12 provided in housing main body 10 toward the side opposite to combustion chamber S1 (that is, the side of flange portion 26 of connector portion 20B).

In such a construction, when swaging portion 12 is provided in housing main body 10, intimate contact between swaging portion 12 of housing main body 10 and cylindrical portion 25 of connector portion 20B is enhanced.

Therefore, in an example where the construction is adopted, in addition to the effect described in the first embodiment above, enhanced performance of sealing between housing main body 10 and first barrel portion 21 can be achieved.

Second Embodiment

Figure 7:
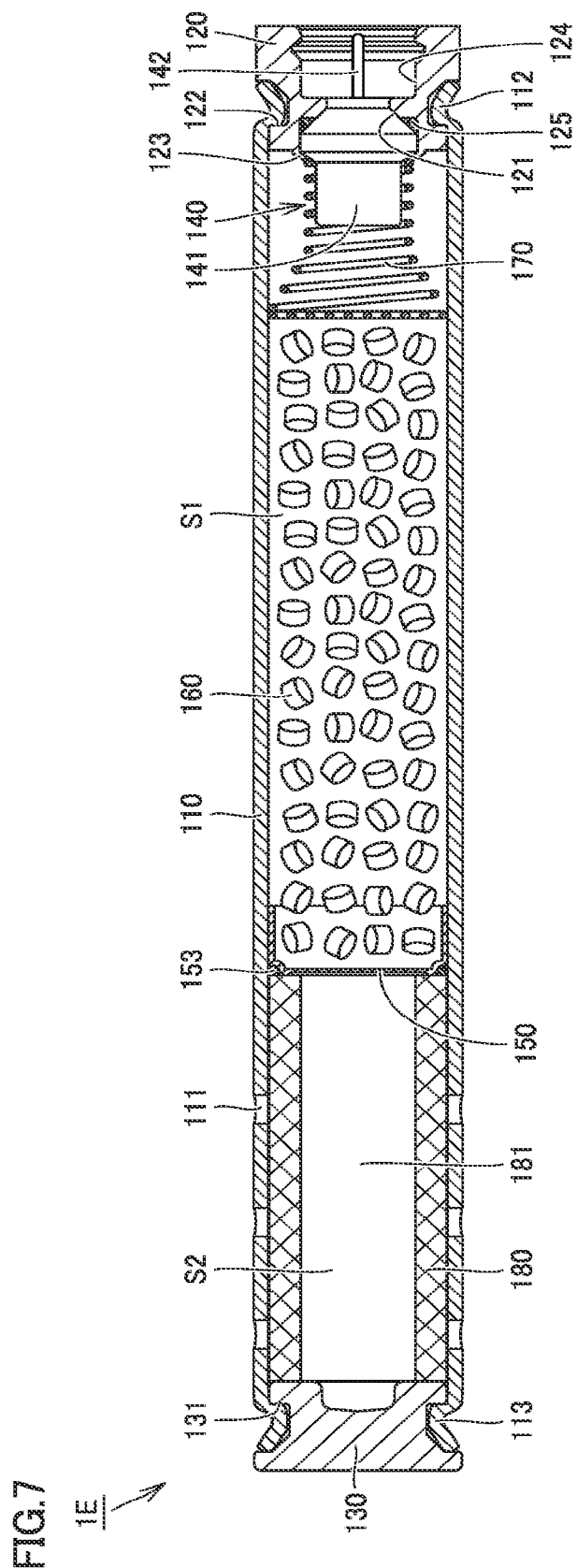
FIG. 7 is a schematic diagram of a cylinder type gas generator according to a second embodiment.
Figure 8:
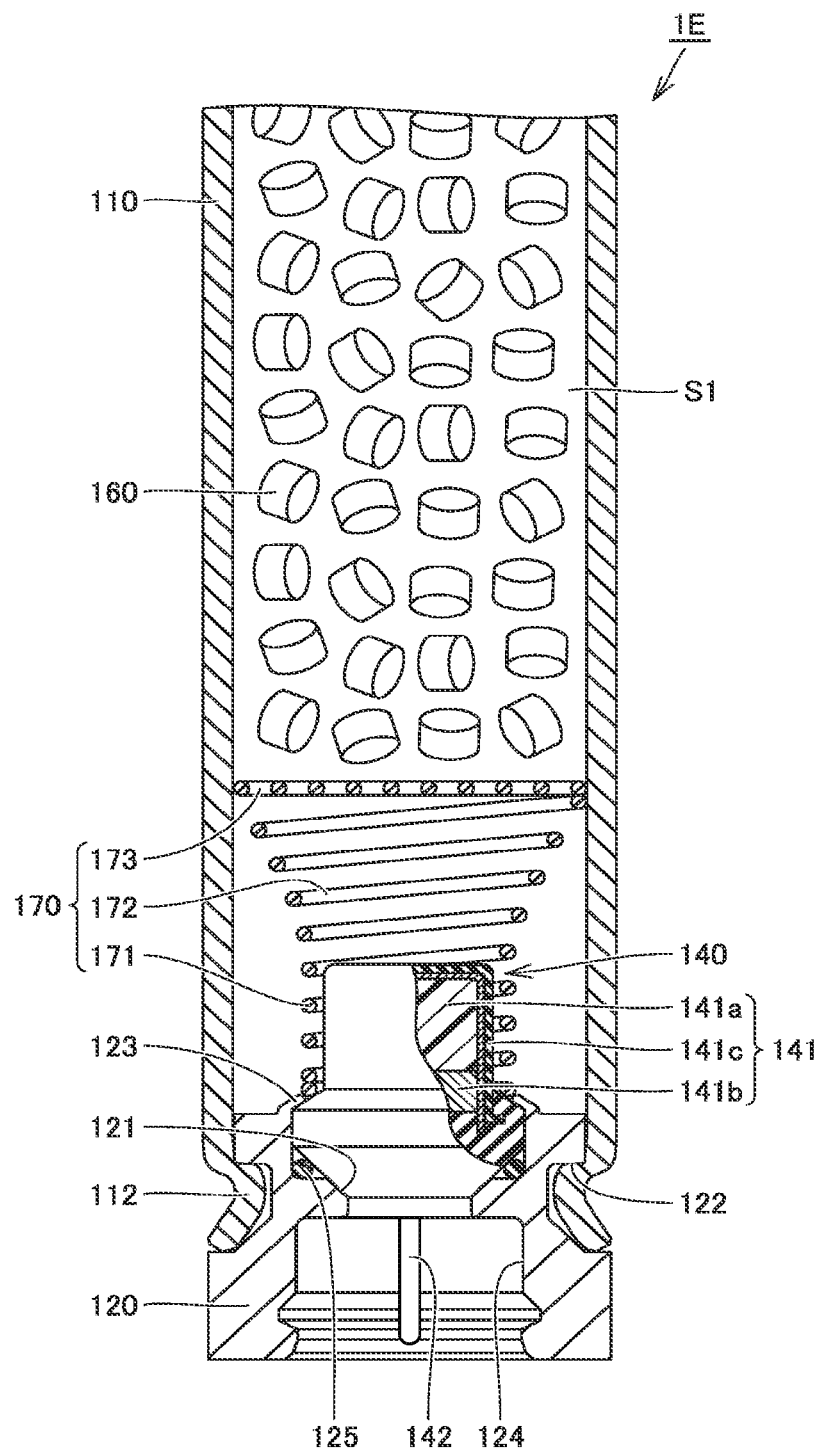
FIG. 8 is an enlarged cross-sectional view of the vicinity of an igniter of the cylinder type gas generator shown in FIG. 7.
Figure 9:
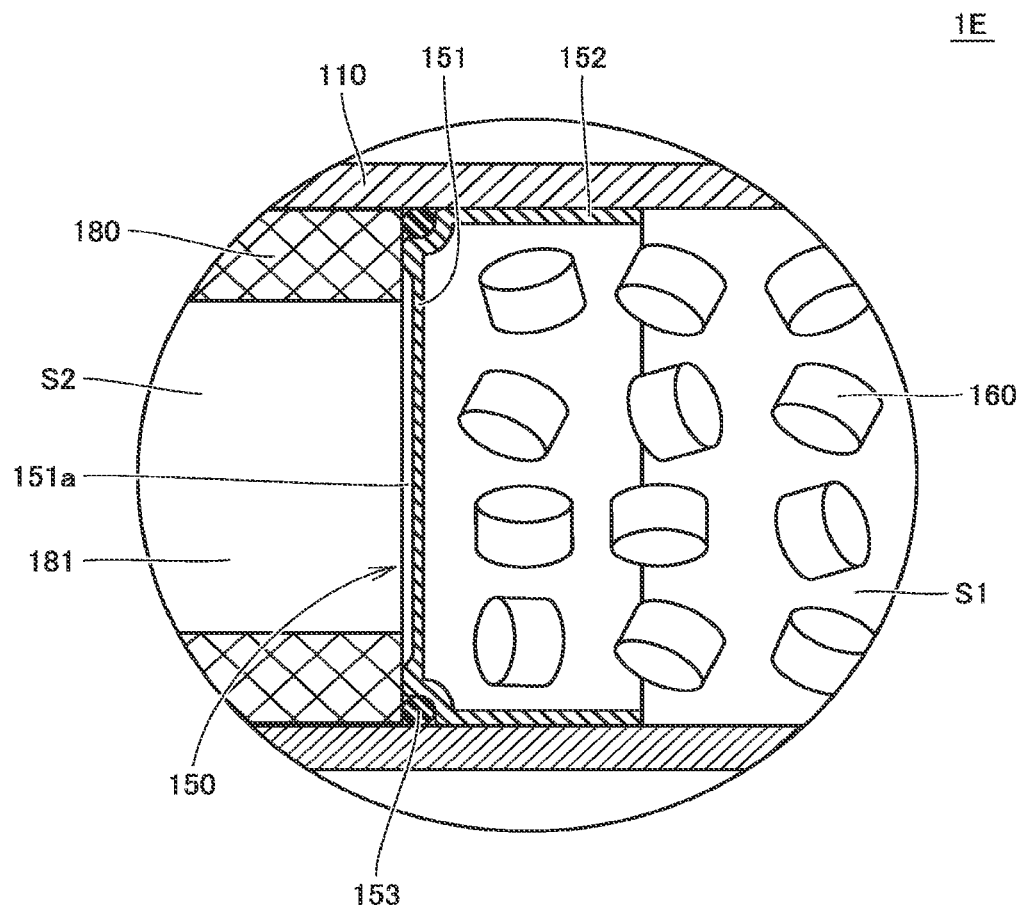
FIG. 9 is an enlarged cross-sectional view of the vicinity of a partition member of the cylinder type gas generator shown in FIG. 7.

FIG. 7 is a schematic diagram of a cylinder type gas generator according to a second embodiment. FIGS. 8 and 9 are an enlarged cross-sectional view of the vicinity of an igniter and the vicinity of a partition member of the cylinder type gas generator shown in FIG. 7, respectively. A construction of cylinder type gas generator 1E according to the present embodiment will initially be described with reference to FIGS. 7 to 9.

As shown in FIG. 7, cylinder type gas generator 1E according to the present embodiment is similar in construction to cylinder type gas generator 1 according to the first embodiment described above, and includes a housing main body 110, a holder 120, and a closing member 130 as the housing and an igniter 140, a partition member 150, a gas generating agent 160, a coil spring 170, and a filter 180 as internal components accommodated in the inside of the housing.

Housing main body 110 is made of an elongated circular cylindrical member which implements a circumferential wall portion of the housing and has an opening provided at each of opposing ends in the axial direction. Holder 120 is formed from a cylindrical member including a through portion 121 which extends in a direction the same as the axial direction of housing main body 110, and includes in its outer circumferential surface, an annular groove portion 122 for fixing by swaging which will be described later. Closing member 130 is formed from a member in a shape of a disc having a prescribed thickness and includes in its circumferential surface, an annular groove portion 131 for fixing by swaging which will be described later. Annular groove portions 122 and 131 for fixing by swaging are provided in the outer circumferential surface of holder 120 and the circumferential surface of closing member 130, respectively, as extending in the circumferential direction.

Housing main body 110 and closing member 130 can be identical in material to housing main body 10 and closing member 30 in the first embodiment described above, and holder 120 can be identical in material to holder portion 20A of holder assembly 20 in the first embodiment described above.

Holder 120 is fixed to housing main body 110 so as to close one axial opening end of housing main body 110. Specifically, while holder 120 is inserted in one opening end of housing main body 110, a portion of housing main body 110 corresponding to annular groove portion 122 provided in the outer circumferential surface of holder 120 is engaged with annular groove portion 122 as being decreased in diameter radially inward, so that holder 120 is fixed by swaging to housing main body 110. Thus, one axial end of the housing is implemented by holder 120.

Closing member 130 is fixed to housing main body 110 so as to close the other axial opening end of housing main body 110. Specifically, while closing member 130 is inserted in the other opening end of housing main body 110, a portion of housing main body 110 corresponding to annular groove portion 131 provided in the circumferential surface of closing member 130 is engaged with annular groove portion 131 as being decreased in diameter radially inward so that closing member 130 is fixed by swaging to housing main body 110. The other axial end of the housing is thus implemented by closing member 130.

Such fixing by swaging can be omnidirectional swaging described in the first embodiment above. With such omnidirectional swaging, swaging portions 112 and 113 are provided in housing main body 110. Swaging portions 112 and 113 are thus in direct contact with annular groove portions 122 and 131, respectively, so that a gap is prevented from being provided therebetween.

A structure for assembly of holder 120 and closing member 130 to housing main body 110 is not limited to the assembly structure described above, and another assembly structure may be adopted. Alternatively, housing main body 110 and closing member 130 do not have to be separate members, and they may be implemented as one member in a shape of a cylinder with bottom.

As shown in FIGS. 7 and 8, igniter 140 is assembled to the above-described one axial end of the housing by being supported by holder 120. Igniter 140 serves to burn gas generating agent 160 and is set to face a space in the housing.

Igniter 140 includes an ignition portion 141 and a pair of terminal pins 142. Ignition portion 141 includes an ignition agent 141a, a plug 141b, and a cup body 141c (corresponding to the squib cup described in the first embodiment above). Ignition agent 141a is arranged in a space defined by plug 141b and cup body 141c, and accommodated in ignition portion 141. In ignition portion 141, a resistor (bridge wire) is attached to be connected to the pair of terminal pins 142, and ignition agent 141a is loaded in ignition portion 141 so as to surround the resistor or to be in contact with the resistor. An enhancer agent may be loaded in ignition portion 141 as necessary.

Elements similar to the resistor, the ignition agent, and the enhancer agent in the embodiment described above can be employed as the resistor, the ignition agent, and the enhancer agent. Cup body 141c provided in ignition portion 141 includes a metallic cup.

Igniter 140 is fixed to holder 120 by a swaging portion 123 provided in holder 120. More specifically, holder 120 includes swaging portion 123 for fixing by swaging of igniter 140 at the axial end which faces a space in the housing. Swaging portion 123 described above is swaged while igniter 140 is inserted in through portion 121 and abuts on a portion of a wall portion defining through portion 121 of holder 120, so that igniter 140 is fixed to holder 120 as being held by holder 120.

Igniter 140 is thus assembled to holder 120 such that ignition portion 141 thereof projects toward the inside of the housing. Therefore, at the time of activation of igniter 140, cup body 141c is cleaved by ignition of ignition agent 141a, which opens cup body 141c.

A sealing member 125 formed from an O ring or the like is interposed between holder 120 and igniter 140 so as to bury and seal a gap between holder 120 and igniter 140. According to such a construction, airtightness in that portion can therefore be ensured. The method of fixing igniter 140 is not limited to the fixing method with the use of swaging portion 123 described above, and another fixing method may be used.

A depression portion 124 continuous to through portion 121 described above is provided at the axial end of holder 120 exposed to the outside. Depression portion 124 provides a female connector portion which receives a male connector (not shown) of a harness for connecting igniter 140 and a control unit (not shown) to each other, and a portion close to a tip end of terminal pin 142 of igniter 140 is located as being exposed in depression portion 124. A male connector is inserted in depression portion 124 serving as the female connector portion so that electrical conduction between a core of the harness and terminal pin 142 is achieved.

As shown in FIGS. 7 and 9, partition member 150 is arranged at a prescribed position in the space in the housing. Partition member 150 is a member for partitioning the space in the housing into combustion chamber S1 and filter chamber S2 in the axial direction.

Partition member 150 is substantially in a shape of a circular cylinder with bottom, and formed from a member made of metal such as stainless steel, iron steel, an aluminum alloy, or a stainless alloy. Partition member 150 includes a separation wall portion 151 in a form of a flat plate arranged to be orthogonal to the axial direction of housing main body 110 and an annular wall portion 152 in a form of a cylindrical wall erected from a circumferential edge of separation wall portion 151. Partition member 150 is arranged such that a main surface on an outer side of separation wall portion 151 abuts on filter 180 and an outer circumferential surface of annular wall portion 152 abuts on an inner circumferential surface of housing main body 110.

A score 151a is provided in a main surface of separation wall portion 151 which abuts on filter 180. Score 151a serves to provide an opening as a result of rupture of separation wall portion 151 with increase in internal pressure in combustion chamber S1 as a result of burning of gas generating agent 160, and it is provided, for example, as a plurality of grooves provided to radially intersect with one another. Score 151a is provided in a portion in filter 180 opposed to a hollow portion 181.

An annular groove portion that extends along the circumferential direction is provided in a circumferential edge of separation wall portion 151 that defines a boundary between separation wall portion 151 and annular wall portion 152. An O ring 153 is accommodated in this annular groove portion. According to such a construction, O ring 153 is interposed between partition member 150 and housing main body 110 and in pressure contact with both of partition member 150 and housing main body 110.

O ring 153 thus buries the gap between partition member 150 and housing main body 110. Therefore, as the gap is sealed by O ring 153, airtightness in that portion can be ensured.

Partition member 150 is fixed to housing main body 110 while it is located in housing main body 110. More specifically, partition member 150 is press-fitted into the inside of the housing main body, so that annular wall portion 152 of partition member 150 is in pressure contact with housing main body 110. Therefore, partition member 150 is fixed to housing main body 110 owing to elastic resilience of annular wall portion 152.

As shown in FIGS. 7 to 9, in the space in the inside of the housing, gas generating agent 160 and coil spring 170 are arranged in a space lying between holder 120 and partition member 150 (that is, combustion chamber S1).

A gas generating agent similar to gas generating agent 60 in the embodiment described above can be employed as gas generating agent 160.

As shown in FIGS. 7 and 8, in combustion chamber S1, coil spring 170 is arranged in a space located closer to holder 120 relative to gas generating agent 160. Coil spring 170 is formed by bending a metal wire rod, and includes a circular cylindrical portion 171, an increased-diameter portion 172, and a pressing portion 173.

Circular cylindrical portion 171 is formed by helical winding of a metal wire rod such that an inner diameter thereof is constant. Circular cylindrical portion 171 is thus generally in a shape of a substantially circular cylinder. Circular cylindrical portion 171 is located on a side of holder 120 (that is, the side of the above-described one end of the housing) and one axial end thereof abuts on holder 120 and/or igniter 140.

Increased-diameter portion 172 is constructed by helical winding of a metal wire rod such that an inner diameter thereof increases toward gas generating agent 160, and it is thus generally substantially in a shape of a hollow frustum of a cone. Increased-diameter portion 172 extends from the other axial end of circular cylindrical portion 171 (that is, an end on the side of gas generating agent 160) toward gas generating agent 160. An outer diameter at the end of increased-diameter portion 172 on the side of gas generating agent 160 is approximately equal to or slightly smaller than the inner diameter of housing main body 110.

Pressing portion 173 is located at the end of increased-diameter portion 172 on the side of gas generating agent 160. Pressing portion 173 is generally constructed substantially in a shape of a disc, for example, by arrangement of metal wire rods substantially in parallel to one another at prescribed intervals or spiral arrangement of a metal wire rod at prescribed intervals. Pressing portion 173 is in contact with gas generating agent 160.

Coil spring 170 is arranged to surround ignition portion 141 of igniter 140 having a substantially columnar outer geometry. In other words, coil spring 170 is arranged to surround ignition portion 141 substantially coaxially therewith without another member being interposed between coil spring 170 and ignition portion 141. Ignition portion 141 thus has a side surface surrounded by a part of circular cylindrical portion 171 of coil spring 170, and a space located between ignition portion 141 and gas generating agent 160 is surrounded by a remaining part of circular cylindrical portion 171 of coil spring 170 and increased-diameter portion 172.

Coil spring 170 is compressed by being sandwiched between holder 120 and/or igniter 140 and gas generating agent 160. Thus, gas generating agent 160 is elastically biased toward partition member 150 by coil spring 170 (that is, toward above-described the other end of the housing which is opposite to the side where holder 120 is located) and prevented from moving in the housing. Therefore, according to such a construction, gas generating agent 160 made of a molding can be prevented from being crushed by vibration or the like.

In assembly of coil spring 170, coil spring 170 is sandwiched between holder 120 and/or igniter 140 and gas generating agent 160 and compressed, so as to also accommodate variation in dimension among various components accommodated in the housing.

Furthermore, an axial length of coil spring 170 is appropriately set to appropriately secure also a distance from igniter 140 assembled to one end of the housing to gas generating agent 160. Therefore, since cleavage of cup body 141c of ignition portion 141 is not blocked by gas generating agent 160 at the time of activation of igniter 140, gas generating agent 160 can be ignited early and reliably.

In addition, in cylinder type gas generator 1E according to the present embodiment, as described above, coil spring 170 surrounds ignition portion 141 and the space between ignition portion 141 and gas generating agent 160. Therefore, at the time of cleavage of cup body 141c of ignition portion 141 at the time of activation of igniter 140, a degree of opening of cup body 141c is restricted by coil spring 170. Consequently, directivity can be provided to thermal particles produced in ignition portion 141, details of which will be described later.

As shown in FIG. 7, in the space in the housing, filter 180 is arranged in the space (that is, filter chamber S2) lying between closing member 130 and partition member 150. Filter 180 is formed from a circular cylindrical member having hollow portion 181 extending in a direction the same as the axial direction of housing main body 110, and has one axial end surface abutting on closing member 130 and has the other axial end surface abutting on partition member 150.

Filter 180 functions as cooling means for cooling gas similarly to filter 80 in the first embodiment described above and also functions as removal means for removing slag or the like contained in the gas, and a construction or a material thereof can be the same as that of filter 80 in the first embodiment described above.

A plurality of gas discharge openings 111 are provided along the circumferential direction and the axial direction in a portion of housing main body 110 that defines filter chamber S2. The plurality of gas discharge openings 111 serve for guiding gas which has passed through filter 180 to the outside of the housing.

Since operations of cylinder type gas generator 1E according to the present embodiment at the time of activation are basically similar to operations of cylinder type gas generator 1 according to the first embodiment described above at the time of activation, description thereof will not be repeated.

As described above, in cylinder type gas generator 1E according to the present embodiment, as shown in FIG. 8, coil spring 170 interposed between the one end (that is, holder 120) in the axial direction of the housing and gas generating agent 160 is arranged substantially coaxially with ignition portion 141 to surround ignition portion 141 without interposition of another member between the coil spring and ignition portion 141 of igniter 140. Coil spring 170 surrounds not only ignition portion 141 of igniter 140 but also the space between ignition portion 141 and gas generating agent 160.

According to the construction as such, firstly, ignition portion 141 is surrounded by circular cylindrical portion 171 of coil spring 170, so that cleavage in a sidewall portion of cup body 141c or outward deformation of the sidewall portion at the time of cleavage of cup body 141c of ignition portion 141 can be suppressed. Therefore, an opening can be provided mainly at a tip end which is a portion of cup body 141c located on the side of gas generating agent 160.

Secondly, at the time when the opening is provided at the tip end of cup body 141c as a result of cleavage of cup body 141c of ignition portion 141, the opening portion of cup body 141c comes in contact mainly with increased-diameter portion 172 of coil spring 170 and further outward deformation of the opening portion of cup body 141c can be suppressed. Therefore, increased-diameter portion 172 of coil spring 170 and the opening portion of cup body 141c also function as a kind of a guide that determines a direction of travel of thermal particles.

Therefore, the direction of travel of thermal particles produced in ignition portion 141 concentrates in the axial direction of housing main body 110 and thermal particles can efficiently be guided to gas generating agent 160. Therefore, coil spring 170 exhibits not only a function to fix gas generating agent 160 described above in the inside of the housing but also a function to efficiently guide thermal particles produced in igniter 140 at the time of activation to gas generating agent 160, and provision of a member such as a combustion control cover that has conventionally been required is no longer necessary.

Thus, with cylinder type gas generator 1E according to the present embodiment, the number of components can be smaller than in a conventional example. Accordingly, not only assembly works are simplified, but also the weight of the gas generator as a whole can be reduced. Therefore, while good gas output characteristics are maintained, both of reduction in weight and reduction in manufacturing cost can be achieved.

Figure 10:
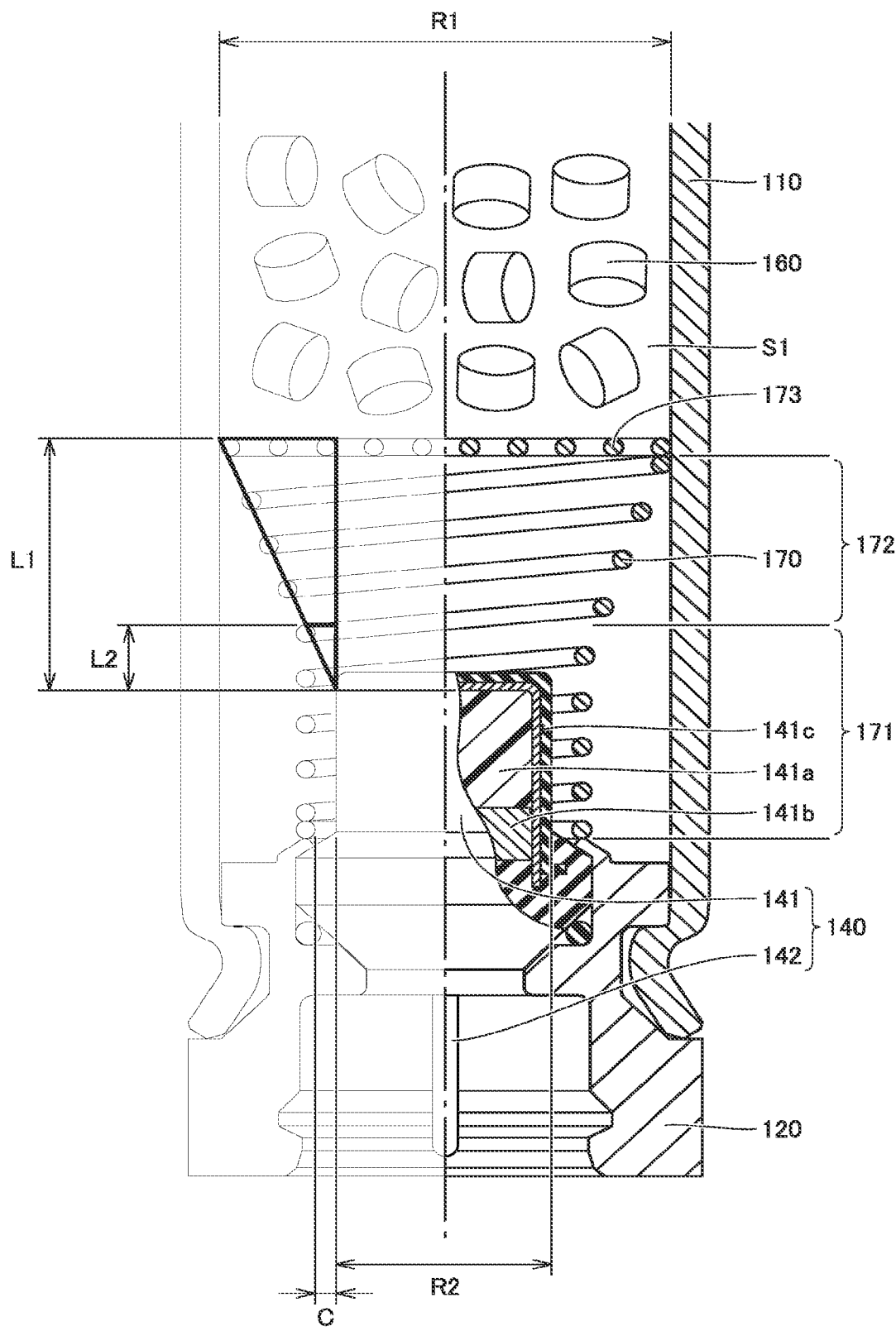
FIG. 10 is a diagram for illustrating a preferred range of a clearance in the cylinder type gas generator according to the second embodiment.

In order to efficiently guide thermal particles produced in ignition portion 141 to gas generating agent 160, directivity should moderately be given to thermal particles. A degree of directivity given to thermal particles is determined, in particular, by a clearance between ignition portion 141 and circular cylindrical portion 171 which is a portion of coil spring 170 surrounding ignition portion 141. A preferred range of the clearance will be described below with reference to FIG. 10. FIG. 10 is a diagram for illustrating a preferred range of the clearance in the cylinder type gas generator according to the present embodiment.

From a point of view of prevention of cleavage or deformation of the sidewall portion of cup body 141c, preferably, there is no clearance between ignition portion 141 and circular cylindrical portion 171. It is not necessarily easy, however, to press-fit coil spring 170 made from a metal wire rod into ignition portion 141, and from a point of view of facilitated assembly works, a slight clearance is desirably provided.

It has been confirmed in results of a verification test which will be described later that a clearance not larger than 1.0 mm is preferred. In consideration of the fact that increased-diameter portion 172 and the opening portion of cup body 141c function also as a kind of the guide, however, an upper limit can be determined as below.

Referring to FIG. 10, specifically, a clearance C between ignition portion 141 and circular cylindrical portion 171 preferably satisfies a condition of $0 < C \leq (R1-R2) \times (L2/L1)/2$ (which is referred to as a "first condition" below), where R1 represents an inner diameter of housing main body 110 that defines the space where gas generating agent 160 is accommodated, R2 represents an outer diameter of ignition portion 141, L1 represents a distance along the axial direction of housing main body 110 from the portion of ignition portion 141 where ignition agent 141a is accommodated to gas generating agent 160, and L2 represents a distance along the axial direction of housing main body 110 from the portion of ignition portion 141 where ignition agent 141a is accommodated to the boundary between circular cylindrical portion 171 and increased-diameter portion 172.

As the first condition is satisfied, gas generating agent 160 is located within a range where thermal particles are guided by increased-diameter portion 172 and the opening portion of cup body 141c when viewed from ignition portion 141. Therefore, thermal particles can very efficiently be guided to gas generating agent 160. Therefore, in order to reliably obtain the effect described above, the first condition is preferably satisfied.

Referring to FIG. 10, clearance C between ignition portion 141 and circular cylindrical portion 171 preferably satisfies a condition (which is referred to as a "second condition" below) of $0 \leq C \leq e \times R2/2$, where R2 represents the outer diameter of ignition portion 141 and e represents a specific percentage of elongation of a material for cup body 141c that makes up ignition portion 141 of igniter 140. Percentage e of elongation represents in percentage, a ratio between elongation between reference lines on a test piece until rupture of the test piece and a gauge length in a tensile test where the material is used.

As the second condition is satisfied, cup body 141c that makes up ignition portion 141 deforms at the time of activation of igniter 140, and before it ruptures, it comes in contact with circular cylindrical portion 171. Further deformation of cup body 141c is thus suppressed. Therefore, in order to reliably obtain the effect described above, the second condition is preferably satisfied.

Third Embodiment

Figure 11:
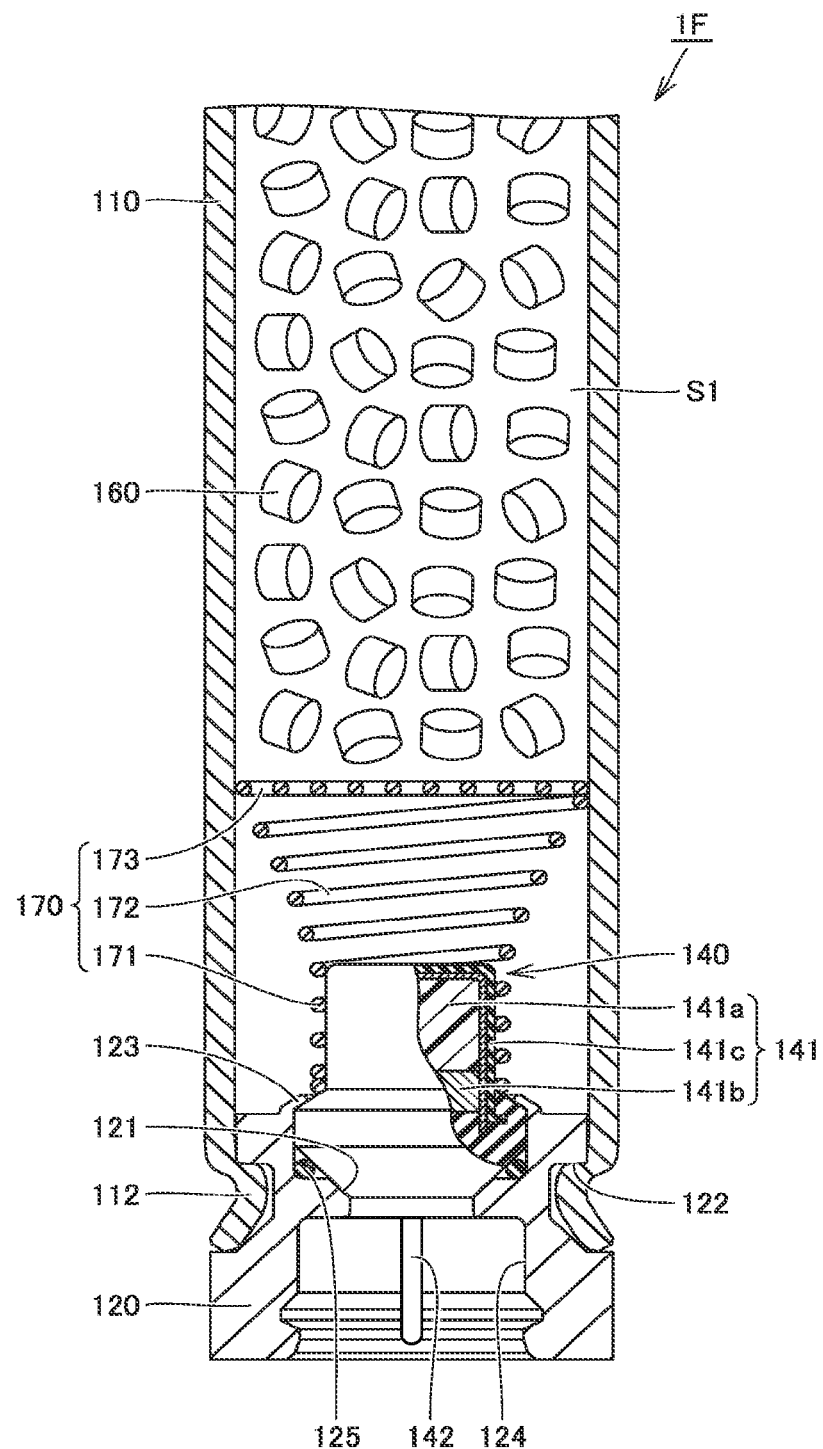
FIG. 11 is an enlarged cross-sectional view of the vicinity of the igniter of a cylinder type gas generator according to a third embodiment.

FIG. 11 is an enlarged cross-sectional view of the vicinity of the igniter of a cylinder type gas generator according to a third embodiment. A cylinder type gas generator 1F according to the present embodiment will now be described with reference to FIG. 11.

As shown in FIG. 11, cylinder type gas generator 1F according to the present embodiment is different from cylinder type gas generator 1E according to the second embodiment described above in inner diameter of circular cylindrical portion 171 of coil spring 170. Circular cylindrical portion 171 is thus in contact with ignition portion 141. In other words, there is no clearance between ignition portion 141 and circular cylindrical portion 171 in cylinder type gas generator 1F according to the present embodiment.

According to such a construction as well, an effect in conformity with the effect described in the second embodiment above is obtained. While good gas output characteristics are maintained, both of reduction in weight and reduction in manufacturing cost can be achieved. According to such a construction, press-fitting of coil spring 170 to ignition portion 141 in assembly works is required, and workability is slightly poorer than in an example where a clearance is provided. Cleavage or deformation of the sidewall portion of cup body 141c, however, can more reliably effectively be prevented.

Fourth Embodiment

Figure 12:
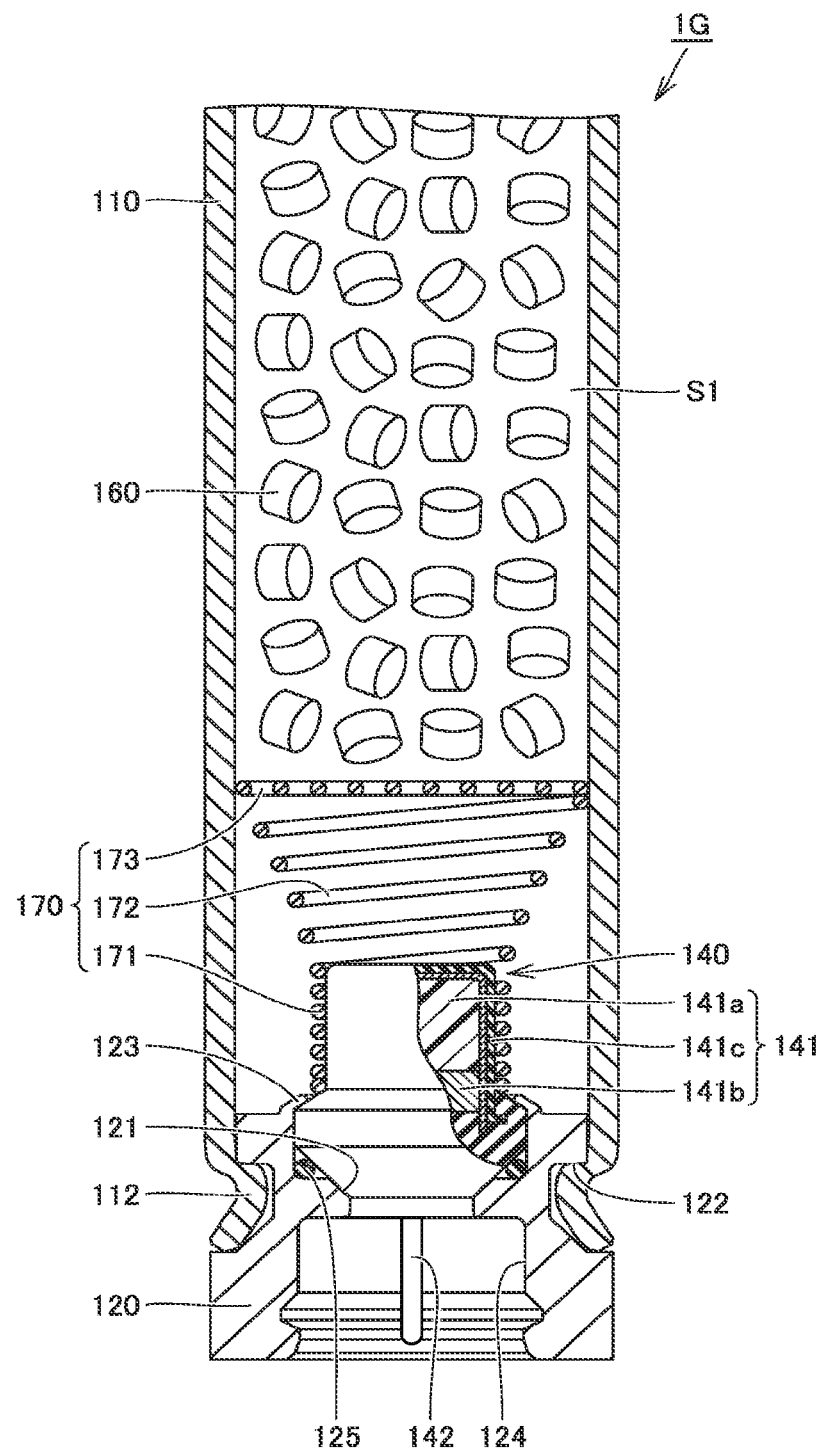
FIG. 12 is an enlarged cross-sectional view of the vicinity of the igniter of a cylinder type gas generator according to a fourth embodiment.

FIG. 12 is an enlarged cross-sectional view of the vicinity of the igniter of a cylinder type gas generator according to a fourth embodiment. A cylinder type gas generator 1G according to the present embodiment will now be described with reference to FIG. 12.

As shown in FIG. 12, cylinder type gas generator 1G according to the present embodiment is different from cylinder type gas generator 1F according to the third embodiment described above only in number of turns of a metal wire rod for circular cylindrical portion 171 of coil spring 170. Specifically, cylinder type gas generator 1G is constructed such that a pitch between metal rod wires in a portion of circular cylindrical portion 171 of coil spring 170 that surrounds ignition portion 141 of igniter 140 is narrow and the number of turns of circular cylindrical portion 171 in that portion is larger.

According to such a construction as well, an effect in conformity with the effect described in the third embodiment above is obtained. While good gas output characteristics are maintained, both of reduction in weight and reduction in manufacturing cost can be achieved. According to such a construction, the number of turns of the metal wire rod in circular cylindrical portion 171 of coil spring 170 is increased, and accordingly, deformation of the sidewall portion of cup body 141c at the time of activation of igniter 140 can more reliably effectively be suppressed.

Fifth Embodiment

Figure 13:
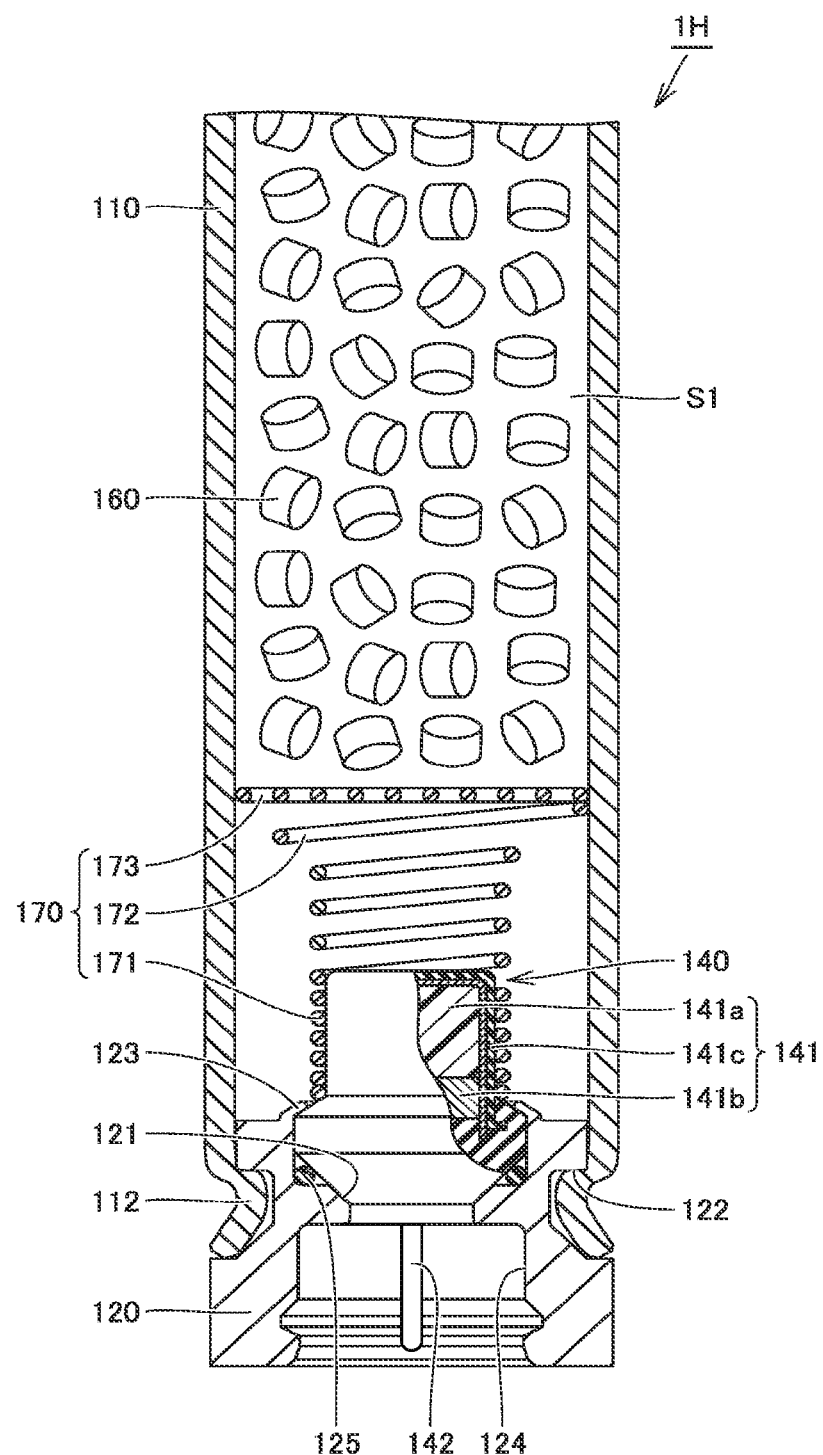
FIG. 13 is an enlarged cross-sectional view of the vicinity of the igniter of a cylinder type gas generator according to a fifth embodiment.

FIG. 13 is an enlarged cross-sectional view of the vicinity of the igniter of a cylinder type gas generator according to a fifth embodiment. A cylinder type gas generator 1H according to the present embodiment will now be described with reference to FIG. 13.

As shown in FIG. 13, cylinder type gas generator 1H according to the present embodiment is different from cylinder type gas generator 1G according to the fourth embodiment described above only in construction of circular cylindrical portion 171 and increased-diameter portion 172 of coil spring 170. Specifically, cylinder type gas generator 1H is longer in axial length of circular cylindrical portion 171 of coil spring 170 and shorter in axial length of increased-diameter portion 172 of coil spring 170 than cylinder type gas generator 1G described above.

In other words, in cylinder type gas generator 1H according to the present embodiment, only an end of a portion of coil spring 170 adjacent to pressing portion 173 is formed as increased-diameter portion 172, so that not only ignition portion 141 of igniter 140 but also most of the space between ignition portion 141 and gas generating agent 160 is surrounded by circular cylindrical portion 171 of coil spring 170.

According to such a construction as well, an effect in conformity with the effect described in the fourth embodiment above is obtained. While good gas output characteristics are maintained, both of reduction in weight and reduction in manufacturing cost can be achieved.

(Verification Test)

A verification test conducted for confirming the effects of the present invention will be described below. In the verification test, cylinder type gas generators according to Verification Examples 1 to 3 based on the second embodiment described above were actually prototyped, and separately therefrom, a cylinder type gas generator according to Comparative Example not based on the second embodiment described above was prototyped. Gas output characteristics were measured by actually activating the cylinder type gas generators according to Verification Examples 1 to 3 and Comparative Example. FIG. 14 shows a table of a test condition and a test result in the verification test.

As shown in FIG. 14, each of the cylinder type gas generators according to Verification Examples 1 to 3 included coil spring 170 described above, so that a degree of opening of cup body 141c of ignition portion 141 was restricted by coil spring 170 (see FIG. 8). Among Verification Examples 1 to 3, the inner diameter of employed coil spring 170 was different, whereas the diameter and the number of turns were identical.

The cylinder type gas generator according to Comparative Example did not include coil spring 170 described above. Instead, the cylinder type gas generator according to Comparative Example was constructed such that only pressing portion 173 provided in coil spring 170 was fixed to housing main body 110 and the distance between ignition portion 141 of igniter 140 and gas generating agent 160 was equal to the distance in the cylinder type gas generators according to Verification Examples 1 to 3 described above.

The cylinder type gas generators according to Verification Examples 1 to 3 and Comparative Example were constructed as being different from one another only in presence of the coil spring described above or inner diameter of the coil spring, and otherwise identical to one another.

Specifically, in each of them, inner diameter R1 of housing main body 110 was set to 17.4 mm and outer diameter R2 of ignition portion 141 was set to 8.05 mm. In each of them, distance L1 along the axial direction of housing main body 110 from the portion of ignition portion 141 where ignition agent 141a was accommodated to gas generating agent 160 was set to 10.5 mm and distance L2 along the axial direction of housing main body 110 from the portion of ignition portion 141 where ignition agent 141 was accommodated to the boundary between circular cylindrical portion 171 and increased-diameter portion 172 was set to 2.3 mm.

The clearance in the cylinder type gas generators according to Verification Examples 1 to 3 was clearance C (that is, the distance between ignition portion 141 and circular cylindrical portion 171) described above, and the clearance in the cylinder type gas generator according to Comparative Example was the distance between ignition portion 141 and housing main body 110.

In the verification test, two samples of the cylinder type gas generator according to each of Verification Examples 1 to 3 and Comparative Example were prepared, each sample was set in a gastight tank and activated therein, and change over time of a pressure in the tank at that time was measured. An output indicator in FIG. 14 is used for evaluation of gas output characteristics, and represents a time from activation of the igniter until change in pressure in the tank.

As shown in FIG. 14, it was confirmed based on results in the verification test that the output indicator was better in the cylinder type gas generators according to Verification Examples 1 to 3 where clearance C between the ignition portion and the circular cylindrical portion was equal to or smaller than 1.0 mm than in the cylinder type gas generator according to Comparative Example where the coil spring was not provided. In other words, it was experimentally confirmed that, according to the construction in which coil spring 170 restricted the degree of opening of cup body 141c of ignition portion 141, gas output was obtained earlier after activation and the output indicator more significantly improved as clearance C was smaller.

(Other Forms)

Characteristic features shown in the first to fifth embodiments and the modifications thereof of the present invention described above can naturally be combined with one another within the scope of the present invention in light of the gist of the present invention. For example, any of the coil springs provided in the cylinder type gas generators according to the second to fifth embodiments described above instead of the coil spring provided in the cylinder type gas generator according to the first embodiment described above may be provided in the cylinder type gas generator according to the first embodiment.

In the first to fifth embodiments and the modifications thereof of the present invention described above, an example in which a component including the circular cylindrical portion and the increased-diameter portion is employed as the coil spring that provides directivity to thermal particles produced in the ignition portion of the igniter is illustrated and described. The coil spring having such an outer geometry, however, does not necessarily have to be employed, but coil springs in various shapes such as a coil spring generally tapered or inversely tapered, a coil spring including a plurality of circular cylindrical portions or increased-diameter portions, or a coil spring constructed as being uniform in inner diameter except for the pressing portion can be employed. In any case, so long as the coil spring is constructed to restrict the degree of opening of the cup body of the ignition portion, a comparable effect can be obtained. The diameter, the number of turns, or a material of the coil spring can also naturally appropriately be modified.

In the first to fifth embodiments and the modifications thereof of the present invention described above, the cylinder type gas generator not equipped with an autoignition agent which self-ignites without depending on activation of the igniter is illustrated and described. The cylinder type gas generator, however, may include the autoignition agent. The autoignition agent self-ignites at a temperature lower than a temperature of self-ignition of the gas generating agent, and it serves not to induce an abnormal operation due to external heating of the cylinder type gas generator in case of fire in a vehicle equipped with an air bag apparatus incorporating the cylinder type gas generator. In providing the autoignition agent in the cylinder type gas generator, for example, the autoignition agent should only be arranged to abut on the partition member in the space in the combustion chamber.

In the first to fifth embodiments and the modifications thereof of the present invention described above, an example in which the present invention is applied to a cylinder type gas generator incorporated in a side air bag apparatus is illustrated and described. Applications of the present invention, however, are not limited thereto and the present invention can be applied also to a cylinder type gas generator incorporated in a curtain air bag apparatus, a knee air bag apparatus, or a seat cushion air bag apparatus or what is called a T-shaped gas generator having an elongated outer geometry similarly to the cylinder type gas generator.

The embodiments and the modifications thereof disclosed herein are thus illustrative and non-restrictive in every respect. The technical scope of the present invention is delimited by the terms of the claims, and includes any modifications within the scope and meaning equivalent to the terms of the claims.

REFERENCE SIGNS LIST 1, 1A to 1H cylinder type gas generator; 10 housing main body; 11 gas discharge opening; 12, 13 swaging portion; 20 holder assembly; 20A holder portion; 20B connector portion; 21 first barrel portion; 21a axial end surface; 21b outer circumferential surface; 22 annular projection; 23a accommodation portion; 23b swaging portion; 24 second barrel portion; 24a inner circumferential surface; 25 cylindrical portion; 25a inner circumferential surface; 26 flange portion; 27 annular stepped surface; 28a first chamber; 28b second chamber; 29 sealing member; 30 closing member; 31 closing portion; 32 sidewall portion; 33 annular recess; 40 igniter; 41 base; 42 ignition portion; 43 terminal pin; 50 partition member; 51 separation wall portion; 51a score; 52 annular wall portion; 60 gas generating agent; 70 coil spring; 71 spring portion; 72 pressing portion; 80 filter; 81 hollow portion; 90 welded portion; 110 housing main body; 111 gas discharge opening; 112, 113 swaging portion; 120 holder; 121 through portion; 122 annular groove portion; 123 swaging portion; 124 depression portion; 125 sealing member; 130 closing member; 131 annular groove portion; 140 igniter; 141 ignition portion; 141*a* ignition agent; 141*b* plug; 141*c* cup body; 142 terminal pin; 150 partition member; 151 separation wall portion; 151*a* score; 152 annular wall portion; 153 O ring; 160 gas generating agent; 170 coil spring; 171 circular cylindrical portion; 172 increased-diameter portion; 173 pressing portion; 180 filter; 181 hollow portion; S1 combustion chamber; S2 filter chamber

The invention claimed is:

1. A gas generator comprising:
a cylindrical housing main body made of metal, the housing main body containing a combustion chamber where a gas generating agent is accommodated;
a holder assembly inserted in an opening end in an axial direction of the housing main body, the holder assembly including a hollow opening like a through hole, the hollow opening extending along a direction in parallel to the axial direction of the housing main body; and
an igniter including an ignition portion where an ignition agent is accommodated and a terminal pin connected to the ignition portion, at least a part of the igniter being arranged in inside of the hollow opening while the ignition portion is located on a side of the combustion chamber and the terminal pin is located opposite to the side of the combustion chamber, wherein
the holder assembly includes
a holder portion made of metal, the holder portion being located on the side of the combustion chamber, the holder portion receiving and holding the igniter, and
a connector portion made of resin, the connector portion being located opposite to the side of the combustion chamber, the connector portion receiving a connector connected to the terminal pin,
the holder portion includes
a first barrel portion in a cylindrical shape that defines the hollow opening, and
an annular projection that projects from the first barrel portion along a radial direction of the housing main body,
the connector portion includes
a second barrel portion in a cylindrical shape that defines the hollow opening, and
a cylindrical portion that extends from the second barrel portion toward the combustion chamber,
the cylindrical portion is inserted in the opening end of the housing main body and externally attached to a portion of the first barrel portion located opposite to the side of the combustion chamber when viewed from the annular projection, and
a portion of the housing main body corresponding to the cylindrical portion is decreased in diameter radially inward, so that the cylindrical portion is compressed by being sandwiched between the portion of the housing main body decreased in diameter and the first barrel portion to seal a gap between the housing main body and the first barrel portion.

2. The gas generator according to claim 1, wherein
the cylindrical portion is larger in inner diameter than the second barrel portion and an annular stepped surface that connects an inner circumferential surface of the second barrel portion and an inner circumferential surface of the cylindrical portion to each other is provided in the connector portion, so that a first chamber defined by the annular stepped surface and the inner circumferential surface of the cylindrical portion is provided at an axial end of the connector portion located on the side of the combustion chamber, and
the first barrel portion is inserted in the first chamber and an axial end surface of the first barrel portion located opposite to the side of the combustion chamber abuts on the annular stepped surface.

3. The gas generator according to claim 1, wherein
the second barrel portion is larger in inner diameter than the first barrel portion, so that a second chamber defined by an axial end surface of the first barrel portion located opposite to the side of the combustion chamber and an inner circumferential surface of the second barrel portion is provided at an axial end of the holder assembly located opposite to the side of the combustion chamber, and
a portion that receives the connector connected to the terminal pin is defined by the second chamber.

4. The gas generator according to claim 1, wherein
an outer circumferential surface of the first barrel portion is decreased in diameter toward the combustion chamber.

5. The gas generator according to claim 1, further comprising:
a filter arranged in inside of the housing main body; and
a partition member arranged in the inside of the housing main body to divide, in the axial direction of the housing main body, a space in the inside of the housing main body into a filter chamber where the filter is arranged and the combustion chamber, wherein
the partition member is fixed to the housing main body by being welded.

6. The gas generator according to claim 1, further comprising a coil spring interposed between the holder assembly and the gas generating agent, the coil spring fixing the gas generating agent in inside of the housing main body by biasing the gas generating agent toward a side opposite to a side where the holder assembly is located while the gas generating agent is spaced apart from the ignition portion, wherein
the ignition portion includes a cup body cleaved by ignition of the ignition agent at time of activation of the igniter, and
the coil spring is arranged substantially coaxially with the ignition portion to surround the ignition portion without interposition of another member between the coil spring and the ignition portion, so as to restrict a degree of opening of the cup body at time of cleavage of the cup body.

7. The gas generator according to claim 6, wherein
the ignition portion has a substantially columnar outer geometry,
the coil spring includes
a circular cylindrical portion located on a side of the holder assembly and having a constant inner diameter, and
an increased-diameter portion that extends from an end of the circular cylindrical portion on a side of the gas generating agent toward the gas generating agent and increases in inner diameter toward the gas generating agent, and
a portion of the coil spring that surrounds the igniter is implemented by the circular cylindrical portion.

8. The gas generator according to claim 7, wherein
a condition of $0 < C \leq (R1-R2) \times (L2/L1)/2$ is satisfied, where R1 represents an inner diameter of a portion of the housing main body where the gas generating agent is accommodated, R2 represents an outer diameter of the ignition portion, L1 represents a distance along the axial direction of the housing main body from a portion of the ignition portion where the ignition agent is accommodated to the gas generating agent, L2 represents a distance along the axial direction of the housing main body from the portion of the ignition portion where the ignition agent is accommodated to a boundary between the circular cylindrical portion and the increased-diameter portion, and C represents a clearance between the ignition portion and the circular cylindrical portion.

9. The gas generator according to claim 8, wherein the clearance is not larger than 1.0 mm.

10. The gas generator according to claim 6, wherein a portion of the coil spring that surrounds the ignition portion is in contact with the ignition portion.

\* \* \* \* \*